United States Patent
Furrer et al.

(10) Patent No.: US 12,165,674 B1
(45) Date of Patent: Dec. 10, 2024

(54) WRITE DATA MANAGEMENT

(71) Applicant: INTERNATIONAL BUSINESS MACHINES CORPORATION, Armonk, NY (US)

(72) Inventors: Simeon Furrer, Altdorf (CH); Mark Alfred Lantz, Adliswil (CH); Martin Petermann, Zürich (CH); Ilias Iliadis, Rueschlikon (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/594,089

(22) Filed: Mar. 4, 2024

(51) Int. Cl.
*G11B 20/12* (2006.01)
*G11B 5/008* (2006.01)
*G11B 5/596* (2006.01)
*G11B 20/18* (2006.01)

(52) U.S. Cl.
CPC ...... *G11B 20/1202* (2013.01); *G11B 5/00817* (2013.01); *G11B 20/1833* (2013.01)

(58) Field of Classification Search
CPC ... G11B 20/12; G11B 5/59633; G11B 5/5543; G11B 15/00; G11B 5/59688; G11B 15/463; G11B 15/52
USPC ........................................................ 360/48
See application file for complete search history.

(56) References Cited

U.S. PATENT DOCUMENTS

| | | | |
|---|---|---|---|
| 8,495,470 B2 * | 7/2013 | Cideciyan | G06F 3/0682 360/53 |
| 9,513,818 B2 | 12/2016 | Whitney | |
| 10,937,453 B1 | 3/2021 | Butt et al. | |
| 11,061,579 B2 | 7/2021 | Sarafijanovic | |
| 2016/0350017 A1 | 12/2016 | Amir et al. | |
| 2021/0072900 A1 | 3/2021 | Sarafijanovic et al. | |
| 2021/0232346 A1 | 7/2021 | Gokita | |

OTHER PUBLICATIONS

"Convolutional code," Wikipedia, 11 pp., [online][retrieved Feb. 19, 2024] https://en.wikipedia.org/wiki/Convolutional_code.
"Erasure Coding Scheme for Data Protection and Recovery," 6 pp., [online][retrieved Feb. 17, 2024] https://www.hpe.com/psnow/resources/ebooks/a00110181en_us_v11/StorageTiers/SelectECScheme.html.

(Continued)

*Primary Examiner* — Nabil Z Hindi
(74) *Attorney, Agent, or Firm* — KONRAD, RAYNES, DAVDA & VICTOR LLP; William K. Konrad

(57) ABSTRACT

Provided are a computer program product, device, system, and method for write data management. In one embodiment, a write management controller calculates an order for writing data and parity blocks of write data code words on tape media in a variable interleaved fashion which ensures a minimum physical longitudinal separation along the length of tape between data and parity blocks of the same code word. The calculated write order information may be provided back to a host or other data source so that the write data is eventually transmitted to the tape drive for writing on tape media in accordance with the calculated write order. In this manner, a minimum physical longitudinal separation along the length of tape between data and parity blocks of the same code word may be achieved to increase the reliability of the data storage.

25 Claims, 11 Drawing Sheets

(56) References Cited

OTHER PUBLICATIONS

"IBM TS4300 Tape Library," IBM Corporation, 2023, 474 pp. (4 parts).
"Recommended Access Order (ROA) open function," IBM Corporation, Dec. 14, 2023, 1 p., [online][retrieved Feb. 17, 2024] https://www.ibm.com/docs/en/ts4300-tape-library?topic=features-recommended-access-order-rao-open-function.
"ROA—Recommended Access Order," IBM Corporation, Jun. 9, 2023, 2 pp., [online][retrieved Feb. 17, 2024] https://www.ibm.com/docs/en/ts4300-tape-library?topic=features-rao-recommended-access-order.
"Systematic code," Wikipedia, 2 pp., [online][retrieved Feb. 19, 2024] https://en.wikipedia.org/wiki/Systematic_code.

* cited by examiner

WRITE DATA MANAGEMENT

BACKGROUND OF THE INVENTION

1. Field of the Invention

The present invention relates to managing write operations for writing data to a storage drive.

2. Description of the Related Art

For many years, tape storage has offered advantages in terms of cost and storage density compared to other storage technologies, such as disk storage. Data is stored in magnetic tape media in units of data such as data segments, for example, where a particular user data segment may vary in size from 1-byte to the entirety of a tape (terabytes (TBs)) or more. Typical applications of tape storage include back-up and archival storage applications.

In magnetic storage systems such as tape drives, data is read from and written onto magnetic recording media through data channels utilizing magnetic transducers in a tape head. As used herein the term "magnetic" refers to the various magnetic technologies including magnetoresistive read transducers, and magnetic media/recording layer technologies. Data is written on the magnetic recording media by moving a magnetic recording write transducer to a position over the media where the data is to be stored. The magnetic recording write transducer also referred to as a writer transducer, writer element, or simply a writer, then generates a magnetic field at the write gap, which encodes the data into the magnetic recording layer as the magnetic media is moved past the transducer. Data is read from the media by similarly positioning a magnetic reading transducer (or reader element or reader) and then sensing the magnetic field of the magnetic media as it moves past the read transducer. Read and write operations may be independently synchronized with the movement of the media to ensure that the data can be read from and written to the desired location on the media.

Known magnetic tape drives often use ring type write transducers in combination with a process known as shingling to write data in a bi-directional, serpentine fashion on magnetic tape. Multiple tracks are written in parallel by a set of writer transducers into a set of data sub-bands. The data sub-bands have a lateral width approximately equal to the pitch between the writer transducers.

A group of tracks written in parallel down the length of tape is referred to as a wrap. In one known tape drive, a set of tracks in a first wrap are written in the forward tape direction at the top of each data sub-band of a group of data sub-bands. At the end of the tape, the position of the head is shifted down and tracks of another wrap are written at the bottom of the data sub-bands. At the end of this first reverse wrap the head is shifted back up and a second set of tracks is written in the forward tape direction below the first set of tracks in the forward tape direction. In this manner, tracks are written within each data sub-band in a serpentine, clockwise pattern, starting at the top of the sub-band and continuing writing wraps as the sub-band fills from outside to inside of the sub-band. This serpentine, clockwise, outside to inside recording pattern continues until each sub-band of the set of data sub-bands has been filled with data tracks.

In addition to readers and writers for reading and writing data, respectively, known tape heads for large scale data storage often include servo transducers to determine the lateral and longitudinal position on the tape for reading and writing. In one known design, the servo bands are patterned with data in chevron shapes which are read by the tape head servos to detect the position of the tape head relative to the tape with high accuracy. In this design, when reading or writing to a data band, a servo of the tape head is positioned in a servo band above the data being read from or written to, and another servo is positioned in an adjacent servo band below the data.

Erasure coding (EC) in systematic codes, is a known data protection method in which data is broken into a set of data blocks, also known as data fragments or data chunks, which is encoded into one or more parity blocks which are stored on the tape storage media with the set of data blocks in the form of code words. One known encoding scheme utilizes an Exclusive-OR function to generate the parity blocks from the set of data blocks. Each code word includes a set of data blocks, referred to herein as a data portion, and one or more parity blocks (referred to herein as a parity portion) encoded from the set of data blocks of the code word. Thus, in a 2+1 encoding scheme, for example, each code word has a data portion of two data blocks, and a parity portion of one parity block. In the event a data block of the data portion of a particular code word is lost due to a recording or reading error, the lost data block may be reconstructed from the remaining valid data blocks of the code word utilizing the parity block (or blocks) of the parity portion of the particular code word.

Erasure encoded data is often written to and read from a tape drive in one or more data segments. Each data segment comprises code words each of which includes at least one data block and at least one parity block as described above. Data segments formed of such code words, may be files, portions of files, records, or any other data object which may be stored on a data storage tape.

Tape storage applications frequently require a very high degree of reliability when first writing data and then reading the data back when needed. One known method for facilitating high reliability is referred to as a read-while-write operation of the tape drive. During the read-while-write operation, data being written on the tape by writer transducers on the tape head, can be immediately read back by reader transducers on the head. Any write data detected as having been incorrectly written or read back, can be rewritten on the tape to assure that the data is correctly written during the overall write operation.

Another known feature of tape storage systems is known as Recommended Access Order (RAO) which enables tape control applications to accelerate the retrieval of a certain number of files from tape media by reducing the seek time between those files. In one known system of tape drives such as the LTO-9 full-height drive, the tape drive accepts a user data list which identifies a list of data segments to be read from the tape drive in upcoming read operations. A user data segment is typically defined as a grouping of contiguous logical objects (i.e., logical blocks and file marks) and is described by partition number, beginning logical object identifier, and ending logical object identifier. The tape drive reorders the data segments of the user data list into a recommended access order that minimizes the locate portion of the time to read those user data segments. A Recommended Access Order (RAO) list is prepared by the tape drive and transmitted to the host so that once the data segments are actually to be read, read operations can request the data segments in the recommended access order to reduce the time required to access the read data.

SUMMARY

Provided are a computer program product, system, device, and method for managing write data for a tape media. In one aspect, a first list identifying portions of write data code words to be written on the tape media is received, where each code word includes at least one data portion and at least one parity portion related to the at least one data portion of a particular code word. A second list of the portions of write data code words of the first list is generated in which the second list reorders the portions of write data code words of the first list to provide a configurable minimum spatial separation between the at least one data portion and the related at least one parity portion of each code word when written on the tape media. Accordingly, the portions of write data code words are written on the tape media by a tape drive reordered as a function of the second list to provide an actual physical spatial separation along the tape media between the at least one data portion and the related at least one parity portion of each code word of the second list as a function of the minimum spatial separation.

In another aspect, the first list of portions of write data code words is received by the tape drive from a host, and the second list of the portions of write data code words of the first list is generated by the tape drive. The generated second list is transmitted to the host and the portions of write data code words reordered as a function of the second list are received by the tape drive from the host for writing on the tape media.

In yet another aspect, the writing portions of write data code words on the tape media includes writing received write data on the tape media sequentially in wraps and reordering the portions of write data code words of the first list in generating the second list of the portions of write data code words further includes determining whether the at least one data portion and the related at least one parity portion of the same code word to be written to the tape media is to be written in the same wrap.

In still another aspect, reordering the portions of write data code words of the first list in generating the second list of the portions of write data code words includes ordering portions of write data code words of the first list in a first write order pattern for a first code word determined to have a data portion and a parity portion to be written in the same wrap, so that the minimum spatial separation between a data portion and a parity portion of the first code word is maintained.

In another aspect, the first write order pattern interleaves a data portion and a parity portion of one code word with at least one of a data portion and a parity portion of at least one other code word so that the minimum spatial separation between the at least one data portion and the related at least one parity portion of each code word when written on the tape media is maintained.

In still another aspect, writing portions of write data code words on the tape media includes writing received write data on the tape media sequentially in wraps and reordering the portions of write data code words of the first list in generating the second list of the portions of write data code words further includes determining whether a data portion and a parity portion of the same code word to be written to the tape media is to be written in different wraps.

In yet another aspect, reordering the portions of write data code words of the first list in generating the second list of the portions of write data code words further includes ordering portions of write data code words of the first list in a second write order pattern for a second code word determined to have a data portion and a parity portion to be written in different wraps, so that the minimum spatial separation between the at least one data portion and the related at least one parity portion of each code word when written on the tape media is maintained.

In another aspect, the second write order pattern interleaves between a data portion and a parity portion of the second code word with a plurality of at least one of a data portion and a parity portion of a plurality of other code words so that the minimum spatial separation between a data portion and a parity portion of the second code word is maintained.

In still another aspect, the tape drive receives from the host in association with receiving the first list of portions of write data code words, write parameters defining at least one of a data portion size, a parity portion size of a code word of write data, and a specified minimum spatial separation between a data portion and a parity portion of the same code word to be written to the tape media.

In yet another aspect, reordering the portions of write data code words of the first list in generating the second list of the portions of write data code words is a function of additional write parameters including at least one of a tape cartridge type, a medium recording format, a recording density, and a write append point.

In another aspect, reordering the portions of write data code words of the first list in generating the second list of the portions of write data code words is a function of at least one write parameter defining at least one of the data portion size, the parity portion size, the minimal spatial separation, a tape cartridge type, a medium recording format, a recording density, and a write append point.

DETAILED DESCRIPTION

Figure 1:
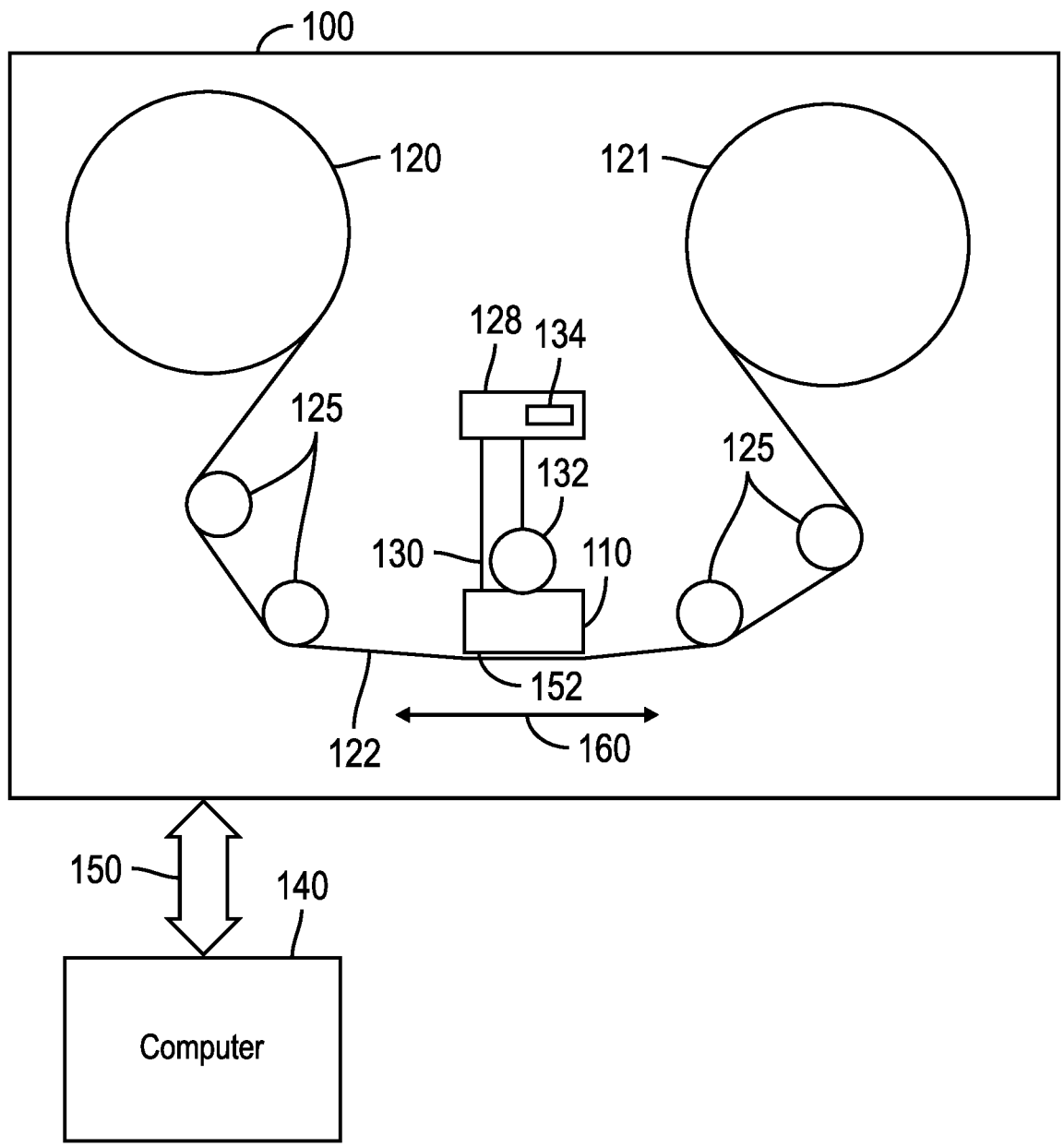
FIG. 1 is a schematic diagram of a data storage system employing write data management in accordance with one embodiment of the present disclosure.

The description herein provides examples of embodiments of the invention, and variations and substitutions may be made in other embodiments. Several examples will now be provided to further clarify various embodiments of the present disclosure:

Example 1. A computer-implemented method for managing write data for a tape media, comprising: receiving a first list identifying portions of write data code words to be written on the tape media, where each code word includes at least one data portion and at least one parity portion related to the at least one data portion of a particular code word, and generating a second list of the portions of write data code words of the first list, including reordering the portions of write data code words of the first list to provide a configurable minimum spatial separation between the at least one data portion and the related at least one parity portion of each code word when written on the tape media. The method further comprising writing on the tape media by a tape drive, the portions of write data code words reordered as a function of the second list to provide an actual physical spatial separation along the tape media between the at least one data portion and the related at least one parity portion of each code word of the second list as a function of the minimum spatial separation. Thus embodiments reordering portions of write data code words facilitate achieving a minimum spatial separation between data and parity portions as write data is written to the tape media. Embodiments ensuring a minimum spatial separation between data and parity portions of write data code words can increase the reliability of data encoding schemes which permit the correction or reconstruction of data to avoid loss of such data from the storage system.

Example 2. The limitations of any of Examples 1 and 3-11, where the first list of portions of write data code words is received by the tape drive from a host, and the second list of the portions of write data code words of the first list is generated by the tape drive, and where the operations further comprise transmitting the generated second list to the host and receiving by the tape drive from the host, the portions of write data code words reordered as a function of the second list for writing on the tape media. Embodiments employing a tape drive to reorder portions of write data code words further facilitate achieving a minimum spatial separation between data and parity portions as write data is written to the tape media, and as a result, improving the reliability of data encoding schemes.

Example 3. The limitations of any of Examples 1-2 and 4-11, where writing portions of write data code words on the tape media includes writing received write data on the tape media sequentially in wraps and where reordering the portions of write data code words of the first list in generating the second list of the portions of write data code words further includes determining whether the at least one data portion and the related at least one parity portion of the same code word to be written to the tape media is to be written in the same wrap. Embodiments determining whether data and parity portions of write data code words are to be written to the same wrap further facilitate achieving a minimum spatial separation between data and parity portions as write data is written to the tape media, and as a result, improving the reliability of data encoding schemes.

Example 4. The limitations of any of Examples 1-3 and 5-11, where reordering the portions of write data code words of the first list in generating the second list of the portions of write data code words includes ordering portions of write data code words of the first list in a first write order pattern for a first code word determined to have a data portion and a parity portion to be written in the same wrap, so that the minimum spatial separation between a data portion and a parity portion of the first code word is maintained. Embodiments employing a first write order pattern to reorder data write code word portions for a code word determined to have a data portion and a parity portion to be written in the same wrap, further facilitate achieving a minimum spatial separation between data and parity portions as write data is written to the tape media, and as a result, improving the reliability of data encoding schemes.

Example 5. The limitations of any of Examples 1-4 and 6-11, where the first write order pattern interleaves a data portion and a parity portion of one code word with at least one of a data portion and a parity portion of at least one other code word so that the minimum spatial separation between the at least one data portion and the related at least one parity portion of each code word when written on the tape media is maintained. Embodiments employing interleaving a data portion and a parity portion of one code word with at least one of a data portion and a parity portion of at least one other code word in a first write order pattern, further facilitate achieving a minimum spatial separation between data and parity portions as write data is written to the tape media, and as a result, improving the reliability of data encoding schemes.

Example 6. The limitations of any of Examples 1-5 and 7-11, where writing portions of write data code words on the tape media includes writing received write data on the tape media sequentially in wraps and where reordering the portions of write data code words of the first list in generating the second list of the portions of write data code words further includes determining whether a data portion and a parity portion of the same code word to be written to the tape media is to be written in different wraps. Embodiments determining whether data and parity portions of write data code words are to be written to different wraps further facilitate achieving a minimum spatial separation between data and parity portions as write data is written to the tape media, and as a result, improving the reliability of data encoding schemes.

Example 7. The limitations of any of Examples 1-6 and 8-11, where reordering the portions of write data code words of the first list in generating the second list of the portions of write data code words further includes ordering portions of write data code words of the first list in a second write order pattern for a second code word determined to have a data portion and a parity portion to be written in different wraps, so that the minimum spatial separation between the at least one data portion and the related at least one parity portion of each code word when written on the tape media is maintained. Embodiments employing a second write order pattern to reorder data write code word portions for a code word determined to have a data portion and a parity portion to be written in different wraps, further facilitate achieving a minimum spatial separation between data and parity portions as write data is written to the tape media, and as a result, improving the reliability of data encoding schemes.

Example 8. The limitations of any of Examples 1-7 and 9-11, where the second write order pattern interleaves between a data portion and a parity portion of the second code word with a plurality of at least one of a data portion and a parity portion of a plurality of other code words so that the minimum spatial separation between a data portion and a parity portion of the second code word is maintained. Embodiments employing interleaving between a data portion and a parity portion of a second code word with a plurality of at least one of a data portion and a parity portion of a plurality of other code words in a second write order pattern, further facilitate achieving a minimum spatial separation between data and parity portions as write data is written to the tape media, and as a result, improving the reliability of data encoding schemes.

Example 9. The limitations of any of Examples 1-8 and 10-11, where the operations further comprise the tape drive receiving from the host in association with receiving the first list of portions of write data code words, write parameters defining at least one of a data portion size, a parity portion size of a code word of write data, and a specified minimum spatial separation between a data portion and a parity portion of the same code word to be written to the tape media. Embodiments employing a tape drive to receive from a host, write parameters associated with a list of portions of write data code words to be written, further facilitate achieving a minimum spatial separation between data and parity portions as write data is written to the tape media, and as a result, improving the reliability of data encoding schemes.

Example 10. The limitations of any of Examples 1-9 and 11, where reordering the portions of write data code words of the first list in generating the second list of the portions of write data code words is a function of additional write parameters including at least one of a tape cartridge type, a medium recording format, a recording density, and a write append point. Embodiments employing additional write parameters to reorder portions of write data code words, further facilitate achieving a minimum spatial separation between data and parity portions as write data is written to the tape media, and as a result, improving the reliability of data encoding schemes.

Example 11. The limitations of any of Examples 1-10, where reordering the portions of write data code words of the first list in generating the second list of the portions of write data code words is a function of at least one write parameter defining at least one of the data portion size, the parity portion size, the minimal spatial separation, a tape cartridge type, a medium recording format, a recording density, and a write append point. Embodiments employing still further write parameters to reorder portions of write data code words, further facilitate achieving a minimum spatial separation between data and parity portions as write data is written to the tape media, and as a result, improving the reliability of data encoding schemes.

Example 12: A computer program product, the computer program product comprising a computer readable storage medium having program instructions embodied therewith, the program instructions executable by a processor to cause the processor to perform a method according to any one of Examples 1-11. Embodiments employing a method for reordering portions of write data code words facilitate achieving a minimum spatial separation between data and parity portions as write data is written to the tape media. Embodiments employing a method for ensuring a minimum spatial separation between data and parity portions of write data code words can increase the reliability of data encoding schemes which permit the correction or reconstruction of data to avoid loss of such data from the storage system.

Example 13: A device comprising at least one processor; and a computer program product comprising a computer readable storage medium having program instructions embodied therewith, the program instructions executable by a processor to perform a method according to any of Examples 1-11. Embodiments employing a method for reordering portions of write data code words facilitate achieving a minimum spatial separation between data and parity portions as write data is written to the tape media. Embodiments employing a method for ensuring a minimum spatial separation between data and parity portions of write data code words can increase the reliability of data encoding schemes which permit the correction or reconstruction of data to avoid loss of such data from the storage system.

Example 14 is an apparatus comprising means to perform a method as claimed in any preceding claim. Embodiments employing a method for reordering portions of write data code words facilitate achieving a minimum spatial separation between data and parity portions as write data is written to the tape media. Embodiments employing a method for ensuring a minimum spatial separation between data and parity portions of write data code words can increase the reliability of data encoding schemes which permit the correction or reconstruction of data to avoid loss of such data from the storage system.

Example 15 is a machine-readable storage including machine-readable instructions, when executed, to implement a method or realize an apparatus as claimed in any preceding claim. Embodiments reordering portions of write data code words facilitate achieving a minimum spatial separation between data and parity portions as write data is written to the tape media. Embodiments ensuring a minimum spatial separation between data and parity portions of write data code words can increase the reliability of data encoding schemes which permit the correction or reconstruction of data to avoid loss of such data from the storage system.

Described embodiments provide improvements to computer technology for storing and retrieving data in storage systems such as tape drive storage systems, for example. Write data management in accordance with the present description can increase the reliability of data encoding schemes which permit the reconstruction of data which may be inadvertently lost from the storage system. In one embodiment, write management in accordance with the present description facilitates achieving a minimum spatial separation between data and parity portions as write data is written to the tape media.

It is appreciated herein that in a known data storage system, the host in writing data to the tape media of a tape drive, typically does not control the physical location of data written to the tape. As a result, data and parity blocks with a large logical separation may nonetheless be written in such a manner as to end up physically near each other in adjacent wraps of the tape. As such, a source of a permanent error in reading a data block in one wrap may also lead to a permanent error in reading the associated parity block of the same code word written in an adjacent wrap. For example, a servo track error may cause a permanent error in reading data from a tape. If both data and parity blocks of a codeword are stored in close physical proximity to the servo track source of the reading error, both data and parity blocks of the same code word may be adversely affected by the servo error such that the code word cannot be reconstructed. Other causes of local reading errors or unrecoverable local data sections may be caused by large media defects, debris particles and media wear, or defective read transducers. As a result, the ability to analyze and guarantee data reliability may be substantially compromised.

Write data management in accordance with the present description can increase the reliability of data encoding schemes by providing a minimum spatial separation between data and parity portions as the data is written to the tape media. In one embodiment, a host or other source of write data provides to a write management controller such as the controller of a tape drive of a data storage system, information about the amount of data to be written in an upcoming write operation. The information provided to or otherwise available to the write management controller may include an identification of the particular erasure encoding scheme in which the write data has been encoded into code words, the length of data and parity blocks in each code word, and a specified minimum spatial separation between the parity block and the data blocks of each code word of the upcoming write operation. The write management controller calculates a recommended order for writing the data and parity blocks in a variable interleaved fashion which ensures a minimum physical longitudinal separation along the length of tape between data and parity blocks of the same code word. The recommended write order information may be provided back to the host or other data source so that the write data is eventually transmitted to the tape drive in accordance with the recommended write order. In this manner, a minimum physical longitudinal separation along the length of tape between data and parity blocks of the same code word may be achieved to increase the reliability of the data storage.

It is appreciated that other advantages may be provided by embodiments employing write data management in accordance with the present description. It is further appreciated that embodiments employing write data management in accordance with the present description may lack one or more advantages discussed herein.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc. Moreover, the figures are schematic figures in which components are represented by shapes simplified for purposes of clarity. In such schematic diagrams, the relative proportional sizes of the various depicted components are not intended to reflect any particular proportional relationships.

FIG. 1 is a schematic diagram illustrating a storage system which includes a tape drive 100 having a tape head 110 for recording write data in data tracks in wraps on magnetic tape media 122. As described in greater detail below, the tape drive 100 employs write data management in accordance with the present description, to increase the reliability of erasure coding of the data stored on the tape 122.

While one specific implementation of a tape drive is shown in FIG. 1, it should be noted that the embodiments described herein may be implemented in the context of any type of tape drive system employing magnetic tape media. In some embodiments, the tape drive 100 may represent a half-height tape drive and in other embodiments, the tape drive 100 may represent a full-height tape drive. Furthermore, it is appreciated that embodiments described herein may be implemented in other types of storage devices having write or read heads for storing or retrieval of data on other types of magnetic media, such as disk drives having sliders, for example.

As shown, a tape supply cartridge 120 and a take-up reel 121 are provided to support a magnetic tape 122 referred to herein as magnetic tape, or simply tape 122. One or more of the reels may form part of a removable cartridge and are not necessarily part of the system 100. The tape drive, such as that illustrated in FIG. 1, may further include drive motor(s) to drive the tape supply cartridge 120 and the take-up reel 121 to move the tape 122 over the tape head 110. The head 110 includes one or more arrays of transducers such as reader, writer, or servo transducers.

Guides 125 guide the tape 122 across the tape head 110. Such tape head 110 is in turn coupled to a tape drive controller 128 via a cable 130. The controller 128 typically controls head functions such as servo following, writing, reading, etc. The controller 128 may operate under logic including logic known in the art or which may be subsequently developed, as well as logic modified as appropriate for write data management of the present description, as well as any logic disclosed herein. The cable 130 may include read/write circuits or channels to transmit data to the head 110 to be recorded on the tape 122 and to receive data read by the head 110 from the tape 122. An actuator 132 is configured to control position of the head 110 relative to the tape 122. An interface of the controller 128 may also be provided for communication between the tape drive and a host (integral or external) or other computer 140 of the storage system to send and receive the data and for controlling the operation of the tape drive and communicating the status of the tape drive to the host, all as will be understood by those of skill in the art. Accordingly, in one embodiment, a host may be represented by the computer 140 and in other embodiments, the computer 140 may be external to both the tape drive 100 and a host.

The storage system represented by the tape drive 100 may include an automated tape library for example, having one or more tape drives 100 docked in the library system. An example of such a tape library is an LTO tape library such as the TS4500 marketed by IBM, which has been modified to employ write data management in accordance with the present description.

The computer 140 represents one or more of host computers, user computers, workstations, storage controllers, or other computers coupled to each other and to the tape drive 100 by one or more networks 150. In one embodiment, a host computer 140 coupled to the tape drive 100 receives requests over a network from user computers to access data in tape cartridges 120 internal to the tape library using tape drives 100 of the tape library.

The computer 140 may be an enterprise computer system in which aspects of a storage system in accordance with the present description may be realized. Examples of enterprise-wide applications include, without limitation, banking transactions, payroll, warehouse, transportation, and batch jobs.

The magnetic tape 122 (FIG. 1) passes over the tape or media facing surfaces 152 of the head 110 in linear, longitudinal forward and reverse (or backward) directions which are generally parallel to the directions represented by an arrow 160. The longitudinal motion of the tape 122 is provided by linear actuators which includes reels 120, 121 (FIG. 1). The linear actuators are configured to move the magnetic tape 122 in the linear, longitudinal directions represented by the arrow 160 past the media facing surfaces 152 of the tape head 110. In this embodiment, the arrow 160 represents the linear, longitudinal directions of motion of the tape caused when being wound and unwound from the reels 120, 121 of the tape drive 100.

As the tape 122 and the head 110 move relative to each other, the tape 122 may be supported by the media facing surfaces 152 of the head 110. Hence, the media facing surfaces are sometimes referred to as media bearing surfaces. The tape 122 and the media facing surfaces 152 of the head 110 are typically in direct contact with each other at least in the region of the tape head where the read and write transducers are located. The head 110 has transducers which provide one or more media facing surfaces 152 of the head 110, and are adapted to at least one of read data from and write data to the magnetic tape 122 moving past the tape head transducers of the head 110. A transducer configured to write data on the tape 122 is referred to herein as a writer transducer, writer element, or simply a "writer."

Figure 2:
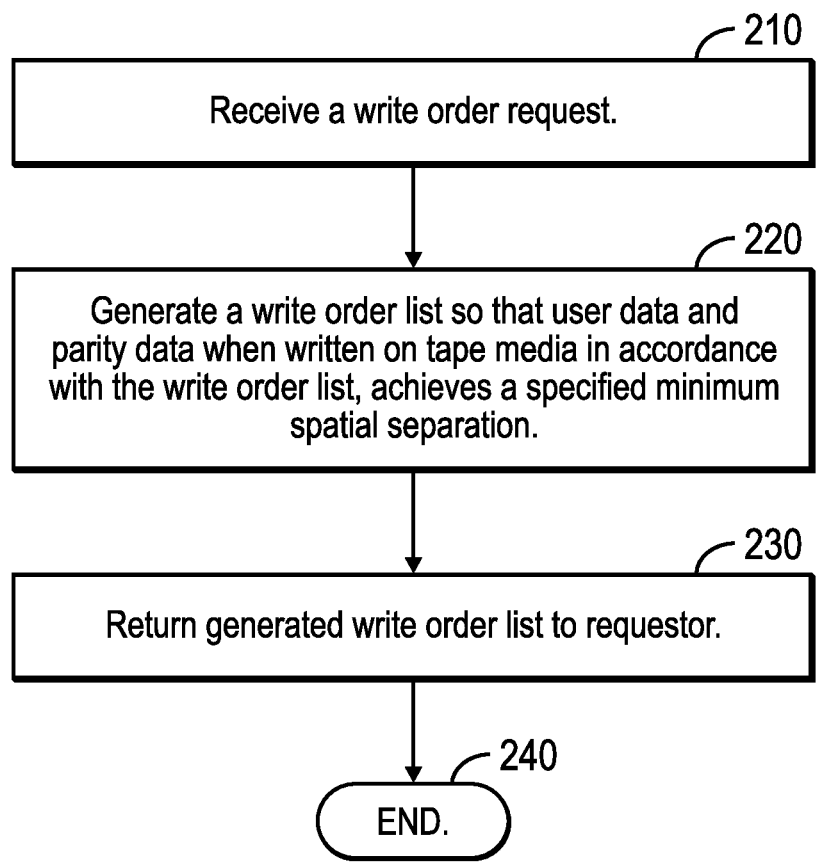
FIG. 2 is an example of operations of a controller employing write data management in accordance with one embodiment of the present disclosure.

FIG. 2 depicts one example of operations of a controller of a data storage system employing one embodiment of write data management in accordance with the present description. In one embodiment, FIG. 2 depicts an example of operations of the tape drive controller 128 (FIG. 1) of a tape drive 100 employing one embodiment of write data management in accordance with the present description. It is appreciated that in other embodiments, the operations depicted in FIG. 2 may be carried out by one or more controllers of other computers such as a controller of the host computer 140 or a controller of a computer external to both the host 140 and the tape drive 100, for example.

The controller operations of FIG. 2 are represented by blocks 210-240 of FIG. 2. It is appreciated that the number and types of operations of a controller such as, for example, a tape drive controller 128 of a tape drive in accordance with embodiments of the present description, may vary, depending upon the particular application. Furthermore, operations may be performed in sequences other than those depicted in FIG. 2. For example, operations may be performed substantially in parallel, depending upon the particular application.

As shown in FIG. 2, a controller such as the tape drive controller 128, for example, receives (block 210, FIG. 2) a write order request which may be generated by a host such as the host 140 (FIG. 1), for example. In one embodiment, the write order request includes, is accompanied by or is otherwise associated with, a list identifying the portions of all the write data code words to be written on the tape media in an upcoming write operation. Each code word to be written on the tape media in connection with the upcoming write operation, includes at least one data portion and at least one parity portion encoded from or otherwise related to the at least one data portion of a particular code word. It is appreciated that in other embodiments, the write order request may be generated or transmitted by computers other than the host computer 140 such as a or a controller of a computer external to both the host 140 and the tape drive 100, for example.

In one embodiment, the writer order request may include, be accompanied by or otherwise associated with various write parameters for the upcoming write operation such as write parameters specifying the size of each data or parity portion, or a write parameter specifying a minimum spatial separation between data and parity portions to be achieved as write data is written to the tape media. One or more of these write parameters may be configured or preconfigured at various locations of the system such as at the source of the write order request or in the tape drive 100 prior to receipt of the write order request, for example.

Using the write parameters associated with the upcoming write operation including the specified minimum spatial separation for the write operation, a write order list is generated (block 220, FIG. 2) by the controller 128 in response to the received write order request (block 210, FIG. 2). As explained in greater detail below, the write order list is generated by reordering the data and parity portions of the code words of the upcoming write operation associated with the received (block 210, FIG. 2) write order request in such a manner as to ensure that the specified minimum spatial separation between the data portion and parity portion of each code word is maintained when subsequently written to the tape 122. Upon completion, the requested write order list is returned (block 230, FIG. 2) to the write order requestor which in this embodiment is the source of the write order request. As explained below, the write order requestor uses the received write order list to send the write data to the tape drive for writing to the tape drive in the write operation. More specifically, the write data of the write operation is ordered in accordance with write order list so as to achieve the specified minimum spatial separation between data and parity portions of the code words when actually written to the tape 122.

Figure 3:
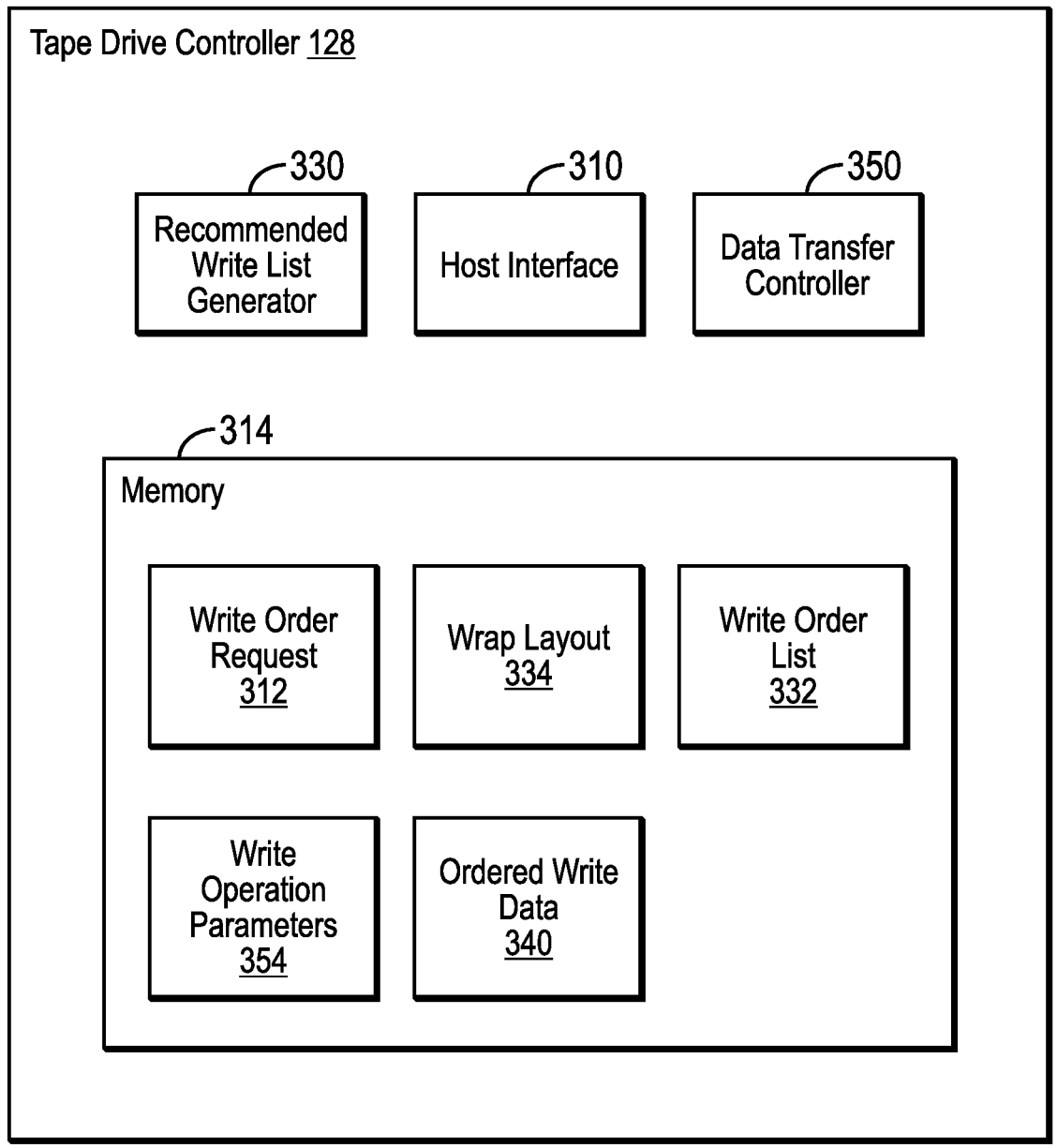
FIG. 3 depicts in greater detail, an embodiment of a tape drive controller of the data storage system of FIG. 1.

FIG. 3 shows a more detailed example of the tape drive controller 128 for performing the write data management operations of FIG. 2. In this embodiment, the controller 128 includes a host interface 310 for receiving (block 210, FIG. 2) a write order request 312 from the host 140 (or other computer) via the network 150 (FIG. 1). The write order request 312 may be stored in a memory 314 of the controller 128 as shown in FIG. 3. In one embodiment, the write order request 312 identifies, in the form of a data write list, a segment or other set of write data to be written to the tape 122 in an upcoming write operation. The data write list may identify code words or portions of code words of the data write list by listing appropriate identification numbers, for example, of those code words or code word portions. In some embodiments, the data write list may merely identify the number of code words or the number of data portions and parity portions of the code words of the data write list of the write order request 312.

As explained in greater detail below, a recommended write order list generator 330 generates a write order list 332 which facilitates achieving a specified minimum spatial separation between data and parity portions as write data is written in a write operation to the tape media. In one embodiment, the write order list 332 reorders the data portions and the parity portions of the code words of the data write list of the write order request 312 in a wrap layout 334 in such a manner as to ensure a minimum spatial separation between the data and parity portions of each code word of the data write list. The write order list 332 which recommends an ordering or re-ordering of the data and write portions of the code words of the data write list, may then be generated from the layout 334 and transmitted (block 230, FIG. 2) to the write order requestor. In response, as explained in greater detail below, the write order requestor can transmit ordered write data 340 in which the data of the data write list has been re-ordered in accordance with the write order list 332, for writing on the tape 122 in a write operation. In this manner, a minimum spatial separation between data and parity portions may be ensured as the write data is written to the tape media in a write operation. A data transfer controller 350 controls head functions such as servo following, writing, reading, etc., during writing and reading operations.

Associated with write operations are write operation parameters 354 which in addition to the data write list, may include for example, the sizes of the data portions and parity portions of the code words of the data write list, a specified minimal spatial separation between the data portions and parity portions of each code word of the data write list, the tape cartridge type of the tape 122, a medium recording format of the write operation, a recording density of the write operation, and a write append point for the write operation. One or more of these write parameters 354 may be configured or preconfigured at various locations of the system such as at the host or other source of the write order request or in the tape drive 100 itself, and stored in the memory 314 prior to receipt of a write order request, for example. Various write parameters may be applied to received write order requests as default values or may be changed as appropriate for each individual write order request. For example, in one embodiment, the write append point changes after each write operation and thus may be determined separately by the tape drive 100 for each received write order request. One or more of these write parameters 354 may be received by the tape drive 100 in association with a write order request and stored in the memory 314 and used to reorder code word portions.

The components of the controller 128 are components of the tape drive 100 in one embodiment. It is appreciated that in other embodiments, one or more of the write data management controller components depicted and described in connection with FIG. 3, may be employed by controllers other than the controller 128 of the tape drive 100, such as a controller of the host 140 or a controller of a computer external to both the host 140 and the tape drive 100, for example.

Figure 4:
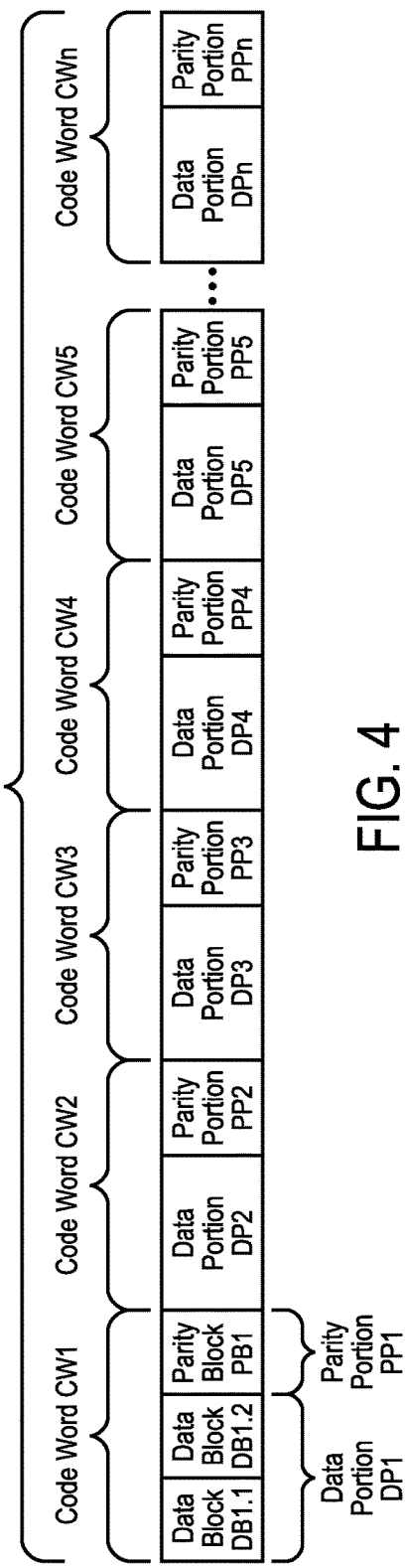
FIG. 4 is a schematic diagram of an example of a write data list for a write operation in the data storage system of FIG. 1.

FIG. 4 shows an example of a data write list 410 listing data to be written by a tape drive onto a tape media in a subsequent write operation. In this example, the data write list 410 includes a sequence of code words, CW1, CW2 . . . CWn, each of which includes a data portion of two data blocks and a parity portion of one parity block, in a 2+1 erasure encoding scheme. Thus, the code word CW1, for example, is depicted as having a data portion DP1 which has two data blocks DB1.1 and DB1.2. The code word CW1 further has a parity portion PP1 which has a single parity block PB1. The other code words of the data write list 410 are similarly constructed. It is appreciated that other encoding schemes may be utilized such that the number of data blocks in each data portion or the number of parity blocks in each parity portion, of each code word, may change, depending upon the particular erasure encoding scheme utilized in connection with write management in accordance with the present description. It is further appreciated that a data write list may have tens, hundreds, thousands, or more code words, depending upon the particular application.

In one embodiment, the requested write order list is generated (block 220, FIG. 2) by the recommended write order list generator 330 (FIG. 3) based upon write operation parameters such as the number and size of data and parity blocks of the write operation to be directed to the tape drive, together with a specified minimum spatial separation associated with the write operation. One or more of these write operation parameters may be communicated by a host 140 or other computer to the controller 128 (FIGS. 1,3) via the host interface 310 (FIG. 3) in the form of a write operation parameter list which accompanies or is otherwise associated with the write order request (210, FIG. 2). In one embodiment, instead of sending write operation parameters with each write order request, one or more of these write operation parameters may be pre-stored in a memory 314 of the tape drive controller 128 in advance of various write operations as known or default write operation parameters for use by the recommended write order list generator 330 in connection with generating a write order list for each such write operation. Furthermore, one or more write operation parameters may be determined by the controller 128 as a function of write operation parameters transmitted to the tape drive controller or write operation parameters prestored in the controller 128.

For example, a write operation parameter associated with the write order request (block 210, FIG. 2) may merely specify that the upcoming write operation will have a particular number N of code words. In an embodiment in which the erasure encoding scheme is known by the controller 128, the generator 330 can determine the number of data blocks and parity blocks of the upcoming write operation based upon a write operation parameter specifying the number of code words of the write operation. For example, if the controller 128 is informed that the erasure encoding scheme used to encode the parity blocks of the write data is the 2+1 encoding scheme, and that the upcoming write operation has N code words, the controller 128 can calculate that such an N code word write operation will have two data blocks for each code word and one parity block for each code word of the write operation for a total of 2N data blocks and N parity blocks for a write operation of N code words. In another embodiment, a write operation parameter list associated with the write order request (block 210, FIG. 2) may explicitly specify that the write operation associated with the write order request will have a total of 2N data blocks and N parity blocks, for example, for a write operation of N code words. In such an embodiment, the write operation parameters provided to the controller 128 may exclude the identity of the erasure encoding scheme.

In one embodiment, a write operation parameter list associated with a write order request may specify the size of the data and parity blocks of the write operation to be directed to the tape drive. This block size information may be expressed, for example, as the number of bits, bytes or other units of data in each block, and may be communicated by a host 140 or other computer to the controller 128 (FIGS. 1,3) via the host interface 310 (FIG. 3) or may be preconfigured in advance of write operations as a known write operation parameter for use by the recommended write order list generator 330. The controller 128 can determine the expected longitudinal length of each block when recorded on the tape as a function of the number of bits in each block, together with other write operation parameters such as the recording density of the tape drive, the recording format and any other factor which may affect the length of each block of the code words when written on the tape in the upcoming write operation.

In one embodiment, a write operation parameter list associated with a write order request (block 210, FIG. 2) may also include a specified minimum spatial separation at which the data blocks are to be physically separated from the parity block (or blocks) of each code word when written to the tape. The specified minimum spatial separation may be expressed in various units such as a separation unit equal to the longitudinal length of one data portion, for example. Thus, a specified minimum spatial separation may be, in one example, 1.5 units and in another example, 1.0 units. It is appreciated that the longitudinal length of the specified minimum spatial separation may vary, depending upon the particular application. The specified minimum spatial separation information may be communicated by a host 140 or other computer to the controller 128 (FIGS. 1,3) via the host interface 310 (FIG. 3)) or may be preconfigured in advance of write operations as a known write operation parameter for use by the recommended write order list generator 330.

Write operation parameters such as block size, encoding scheme, specified minimum spatial separation, a tape cartridge type, a medium recording format, a recording density, etc. may be configurable by a human operator of the storage system through a suitable user interface or programmed automatically by a program executing on the storage system. In other embodiments, these and other write operation parameters may be set as default values which may be overridden by user or programmed configuration in some embodiments.

Figure 5:
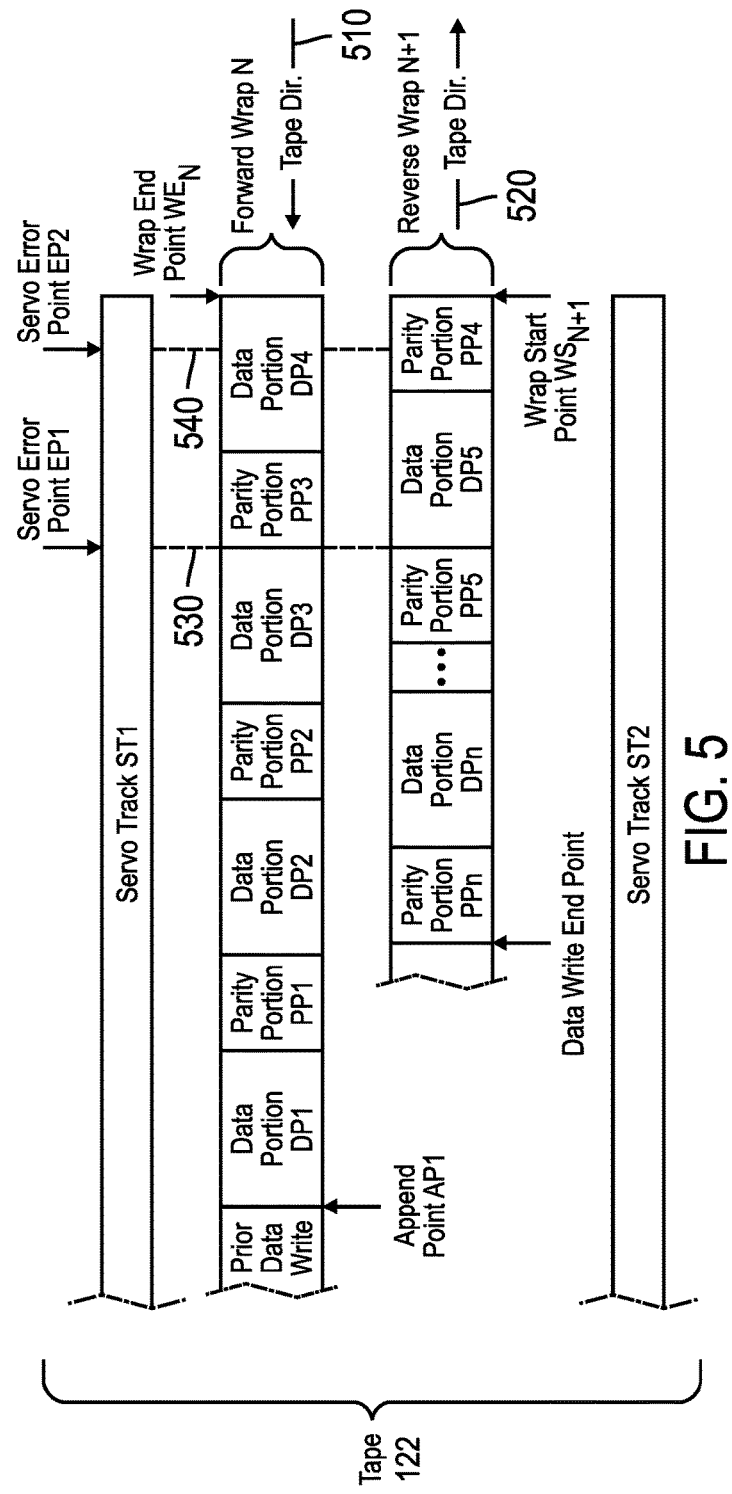
FIG. 5 is a schematic diagram of an example of non-interleaved data written on adjacent wraps of a tape media of the data storage system of FIG. 1.

FIG. 5 is a schematic representation of the code words of the data write list 410 (FIG. 4) when written in a write operation on tape in a fixed write order pattern in which the parity portion of each code word is written on the tape in a logical and physical tape longitudinal position which follows immediately after the tape longitudinal position at which the data portion of the same code word is written. Thus in the example of FIG. 5, the data write list 410 is written on the tape 122 in a sequence of code words which is CW1, CW2 . . . CWn and more particularly, in a sequence of code word portions which includes as follows: data portion DP1, parity portion PP1, data portion DP2, parity portion PP2, data portion DP3, parity portion PP3, data portion DP4, parity portion PP4, data portion DP5, parity portion PP5, . . . data portion DPn and parity portion PPn as shown in FIG. 5.

The data write list 410 is written starting in a wrap N of the tape 122 as the tape moves in a forward longitudinal direction represented by an arrow 510. The writing of the data write list 410 in wrap N starts at an append point AP1 which is the termination point of a prior write operation and continues to the wrap end point $WE_N$ of the wrap N near the end of the tape 122. In this example, the data portion DP4 of the sequence of portions of the data write list 410 is written at the wrap end point $WE_N$ of the wrap N near the end of the tape 122 as shown in FIG. 5.

At the point at which the data portion DP4 has been written at the end of the wrap N, the write operation for the data write list 410 has not completed. Accordingly, after writing the data portion DP4, the direction of the tape reverses to the reverse longitudinal direction represented by the arrow 520, and the writing of the data write list 410 continues in the reverse direction in the next-in-sequence wrap N+1 starting at wrap start point $WS_{N+1}$. In this manner, the remaining portions, that is, parity portion PP4, data portion DP5, parity portion PP5 through the last data portion DPn and parity portion PPn are written in sequence in the next wrap N+1 as shown in FIG. 5. The write operation is terminated with the writing of the last parity portion PPn as indicated at the data write end point which may be in the same wrap N+1 or in a further wrap, depending upon the length of the data write list 410 in this example.

It is appreciated herein that the fixed write order pattern of FIG. 5 does not ensure a minimum spatial separation between the data portion and the parity portion of each code word. As a result, should a defect arise such as a defect in an associated servo track on the tape 122, for example, it may not be possible to correctly read a code word affected by the servo error notwithstanding that the code word was erasure encoded to have a parity portion for data recovery purposes. For example, absent write data management in accordance with the present description, which in one embodiment, ensures a minimum spatial separation between the data portion and the parity portion of each code word, a single servo error can adversely affect accurate reading of both the data portion and the parity portion such that the code word may be permanently lost.

FIG. 5 depicts an example of servo track defects which affect both the data portion and the parity portion of a code word. In this example, a servo track ST1 of a pair of servo tracks ST1, ST2, has defects at two particular locations along the servo track ST1. These defect locations are referenced as servo error points EP1, EP2, respectively and each such servo track defect can adversely affect writing data to or reading data from the tape which may result in permanent loss of data.

In one known design, servo bands such as the servo bands ST1, ST2, are patterned with data in chevron shapes which are read by tape head servos of the tape head to detect the position of the tape head with high accuracy when writing data to or reading data from wraps of the tape. However, a servo track defect can inhibit accurate detection of the tape head location as the tape moves relative to the head, which can prevent accurate data writing to or reading from one or more wraps of the tape.

Figure 5A:
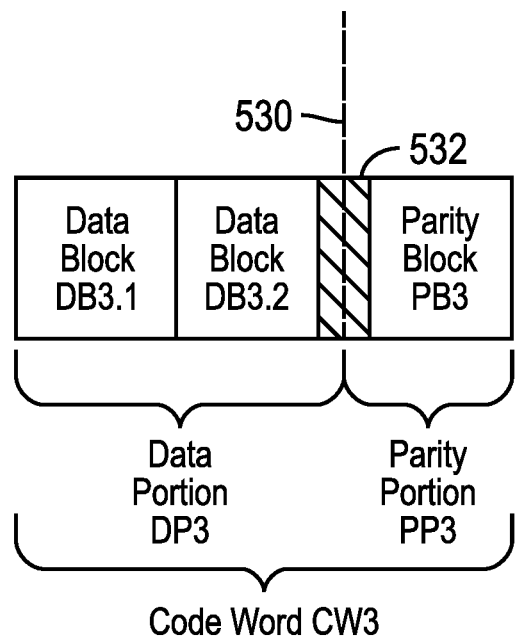
FIGS. 5A, 5B depict examples of servo errors affecting both a data portion and a parity portion of a code word written on a tape media.

More specifically, the servo error point EP1 of the servo track ST1, is depicted in one example as being aligned with the boundary between the data portion DP3 and the parity portion PP3 of the code word CW3 (FIG. 4). This alignment is represented by a hashed line 530 and is a function of tape head position. Thus, when the tape head servo is reading the servo track ST1 at the servo error point EP1, a read sensor of the tape head is positioned to read data at the boundary between the data portion DP3 and the parity portion PP3 written in the wrap N. If the defect at servo error point EP1 of the servo track ST1 is sufficiently long, the reading of data from both the data portion DP3 and the parity portion PP3 may be adversely affected, possibly resulting in an uncorrectable code word CW3 (FIG. 4) and therefore a loss of the data in CW3. Thus, in an 2+1 erasure encoding scheme, the unrecoverable data associated with servo error point EP1 as represented by data corruption area 532 (FIG. 5A) may extend into both data block DB3.2 of the data portion DP3, and into the parity block PB3 of the parity portion PP3 of code word CW3 as shown in FIG. 5A. If reading of both data block PB3.2 (FIG. 4A) and parity block PB3 of code word CW3 is unrecoverable due to the servo track defect at servo error point EP1, the code word CW3 likely cannot be correctly decoded and thus the data block PB3.2 may be permanently lost.

Another example of a servo error point, that is, servo error point EP2, of the servo track ST1, is depicted in FIG. 5 as being aligned with the data portion DP4 of code word CW4 written in wrap N, and also aligned with the parity portion PP4 of the code word CW4 (FIG. 4) written in warp N+1. This alignment is represented by a hashed line 540 and again is a function of tape head position. Thus, when the tape head servo is reading the servo track ST1 at the servo error point EP2, and the tape head is reading wrap N, a read sensor of the tape head is positioned to read data from the data portion DP4. Similarly, when the tape head servo is reading the servo track ST1 at the servo error point EP2 as the tape head is reading wrap N+1, a read sensor of the tape head is positioned to read data from the parity portion PP4 written in the wrap N+1. Thus, because the defect at servo error point EP2 of the servo track ST1 is aligned with both the data portion DP4 of the wrap N, and the parity portion PP4 of the wrap N+1, the reading of data from both the data portion DP4 and the parity portion PP4 may be adversely affected, again possibly resulting in the total loss of code word CW4 (FIG. 4).

Figure 5B:
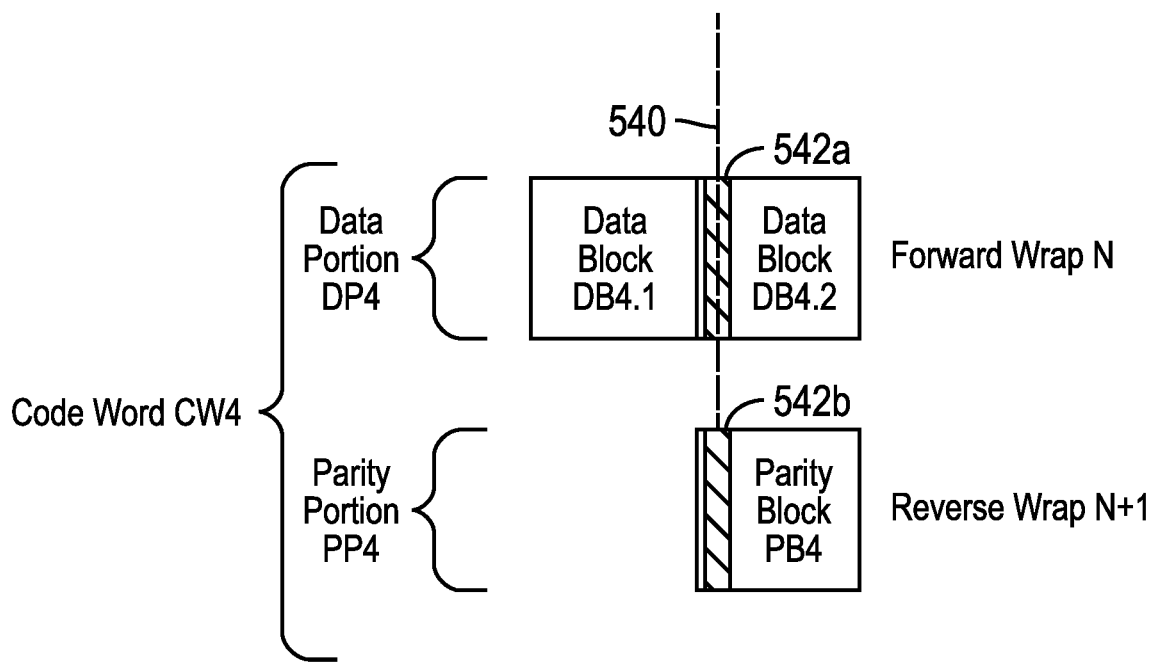

Thus, in an 2+1 erasure encoding scheme, the unrecoverable data associated with servo error point EP2 as represented by data corruption areas 542a, 542b (FIG. 5B) may extend into both data block PB4.2 and parity block PB4, respectively, of code word CW4 as shown in FIG. 5B. If reading of both data block PB4.2 (FIG. 4A) and parity block PB4 of code word CW4 fails due to the servo track defect at servo error point EP2, the code word CW4 likely cannot be decoded and hence the CW4 data block PB4.2 cannot be reconstructed.

Figure 6:
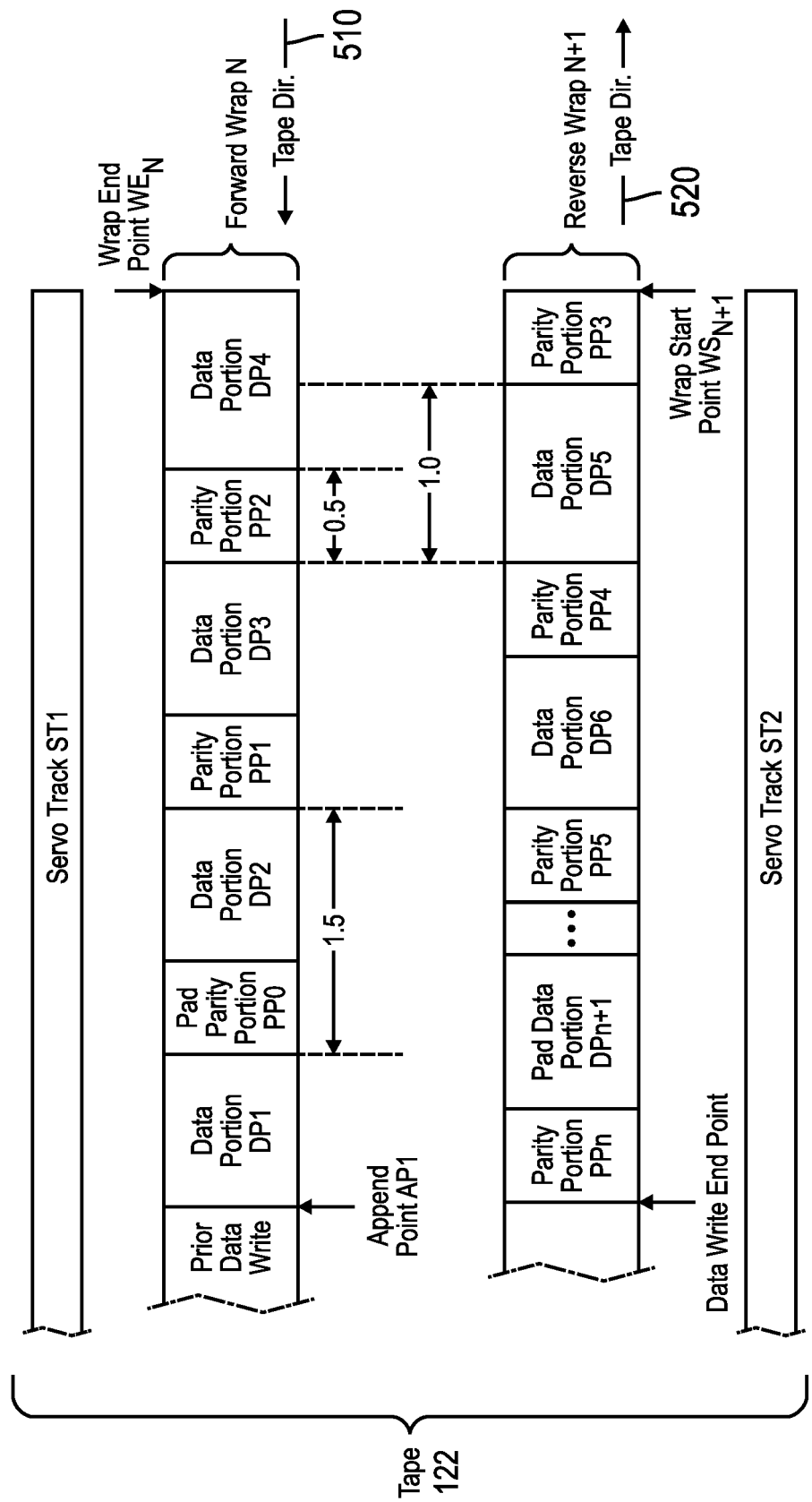
FIG. 6 is a schematic diagram of an example of interleaved data written on adjacent wraps of a tape media of the data storage system of FIG. 1.

FIG. 6 is a schematic representation of the sequence of code words of the data write list 410 (FIG. 4) written on tape in another example of a fixed write order pattern in which the parity portion of a prior code word of the sequence is interleaved between data portions of adjacent code words of the code word sequence of the data write list. In this example, a parity portion PP0 is inserted as a pad portion after the first data portion DP1 of the data write list 410 (FIG. 4) since the data write list 410 (FIG. 4) lacks a code word prior to the first code word CW1. Similarly, in this example, a data portion DPn+1 is inserted as a pad portion before the last parity portion PPn since the data write list 410 (FIG. 4) lacks a code word after the last code word CWn. Thus in the example of FIG. 6, the data write list 410 is written longitudinally on the tape 122 in a sequence of interleaved code word portions, that is, data portion DP1, pad parity portion PP0, data portion DP2, parity portion PP1, data portion DP3, parity portion PP2, data portion DP4, parity portion PP3, data portion DP5, parity portion PP4, data portion DP6 and parity portion PP5 . . . pad data portion PPn+1 and final parity portion PPn as shown in FIG. 6. The pad portions, that is, parity portion PP0 and data portion DPn+1 may be dummy data or may each be a copy of actual data, for example.

Here too, the data write list 410 is written in the write operation of FIG. 6 starting in the wrap N of the tape 122 as the tape moves in a forward longitudinal direction represented by the arrow 510. The writing of the data write list 410 in wrap N starts at an append point AP1 which is the termination point of a prior write operation and continues to the wrap end point $WE_N$ of the wrap N near the end of the tape 122. Thus, starting at append point AP1, a sequence of interleaved code words which is data portion DP1, pad parity portion PP0, data portion DP2, parity portion PP1, data portion DP3, parity portion PP2, and data portion DP4, are written in wrap N. In this example, the data portion DP4 of the sequence of portions is written at the wrap end point $WE_N$ of the wrap N near the end of the tape 122 as shown in FIG. 5.

At the point at which the data portion DP4 has been written to the wrap N, the write operation for the data write list 410 has not completed. Accordingly, after writing the data portion DP4, the direction of the tape reverses to the reverse longitudinal direction represented by the arrow 520, and the writing of the data write list 410 continues in the reverse direction in the next-in-sequence wrap N+1 starting at wrap start point $WS_{N+1}$. In this manner, the remaining portions, that is, parity portion PP3, data portion DP5, parity portion PP4, data portion DP6, parity portion PP5 . . . pad data portion PPn+1 and final parity portion PPn are written in this sequence in the next wrap N+1 as shown in FIG. 6. The write operation is terminated with the writing of the last parity portion PPn as indicated at the data write end point which may be in the same wrap N+1 or in a further wrap, depending upon the length of the data write list 410 in this example.

The fixed write order pattern of FIG. 6 provides a spacing L=1.5 units between the data portion and the parity portion of some of the code words of the data write list, where a spatial separation unit L is the length of a data portion DPx, for example. Thus, the code word CW1 (FIG. 4) has a spacing of 1.5 units between its data portion DP1 and its parity portion PP1 of the code word CW1 as shown in FIG. 6. In some applications a spatial separation of 1.5 units may be an appropriate minimum to ensure that a media defect or a servo track defect is unlikely to prevent the accurate reading of the minimum number of blocks of the data portion and the parity portion of a particular code word, to increase the likelihood that an accurate reconstruction of each erasure encoded code word may be performed if needed.

However, it is appreciated herein that the fixed write order pattern of FIG. 6 does not ensure a minimum spatial separation of 1.5 units between the data portion and the parity portion for a number of code words of the data write list. For example, the code word CW3 (FIG. 4) has a longitudinal spacing of 1.0 units between the data portion DP3 of wrap N, and the parity portion PP3 of wrap N+1 as shown in FIG. 6. As another example, the code word CW4 (FIG. 4) has a longitudinal spacing of 0.5 units between the data portion DP4 in wrap N, and the parity portion PP4 in wrap N+1 as shown in FIG. 6. Thus, in applications specifying a spatial separation of 1.5 units, an actual separation less than 1.5 units may increase the likelihood that a media or servo track defect can prevent the accurate reading of the minimum number of blocks of the data portion and the parity portion necessary for an accurate reconstruction of an erasure encoded code word.

In one aspect of write data management in accordance with the present description, the generator 330 (FIG. 3) of the tape drive controller 128 generates (block 220, FIG. 2) a write order list as a function of a current write append point on tape media and other write parameters, so that user data and parity data when written on tape media in accordance with a write order list, has a minimum specified spatial separation between the data and parity portions of each erasure encoded code word of the data write list. In one embodiment, the generator 330 generates the write order list using a variable interleaved write order pattern to assign blocks of data and parity portions to selected tape layout positions. The write order pattern represented by the layout varies as appropriate to ensure that the blocks of the data and parity portions of the code words of the write list have the minimum specified spatial separation.

Figure 7:
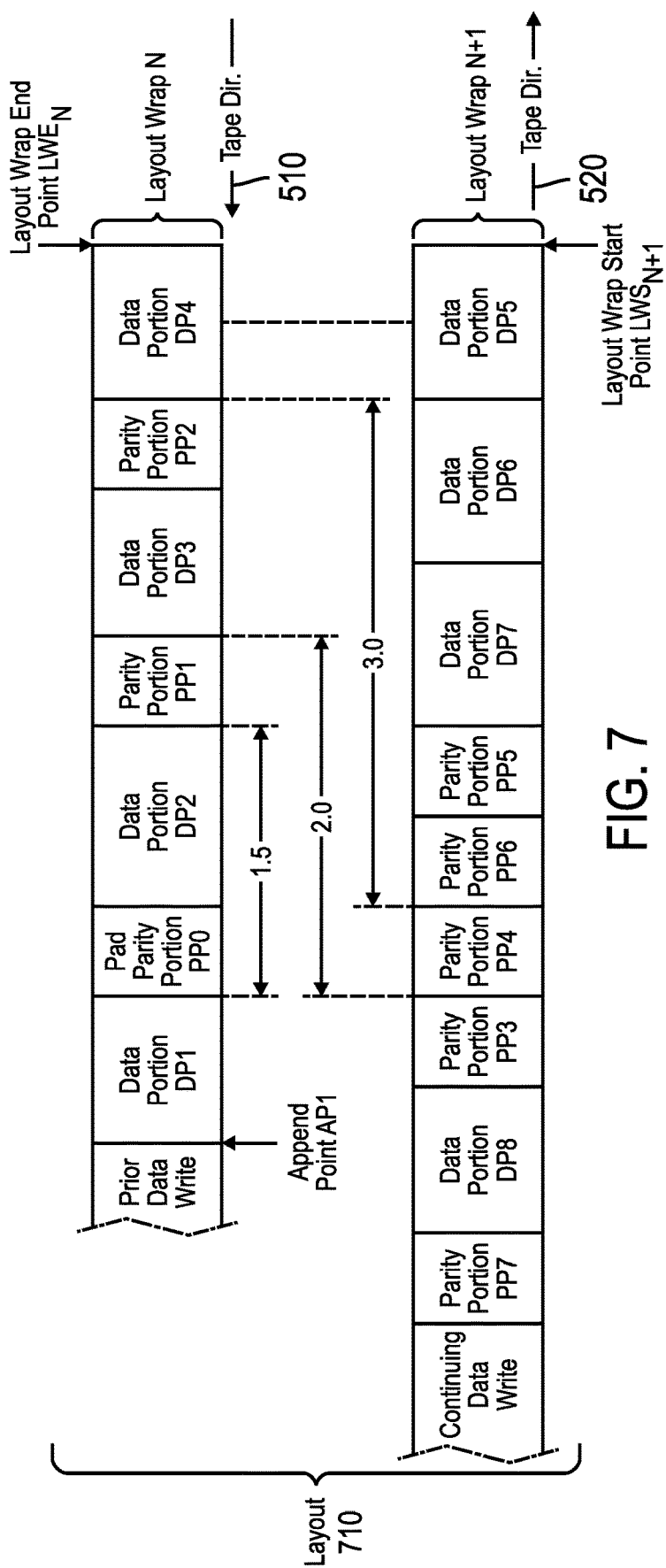
FIG. 7 is a schematic diagram of an example of a recommended write order layout in which data portions and parity portions have been ordered in a manner which maintains a minimum spatial separation between data and parity portions of the same code word, in accordance with an embodiment of write data management of the present description.

FIG. 7 depicts an example of a variable write order pattern in which the data and parity portions of the code words of the code word write list 410 (FIG. 4) have been assigned by the write order list generator 330 to positions of a layout 710 which ensures that the blocks of the data and parity portions of each of the code words of the write list 410 have a minimum specified spatial separation when subsequently written on the tape 122. In this example, the data and parity portions of each of the code words of the data write list 410 are assigned to positions of the layout 710 starting in the wrap N of the layout 710 which corresponds to wrap N of the tape 122. The assigning of the data and parity portions of the code words of the data write list 410 to layout positions in layout wrap N of the layout 710 of this example, matches the write order pattern depicted for tape wrap N of the tape 122 in FIG. 6. Accordingly, the assigning of the data and parity portions of the code words of the data write list 410 to layout positions in layout wrap N of the layout 710 starts at an append point AP1 which is the known termination point of a prior layout for a prior write operation, and continues to the layout wrap end point $LWE_N$ of the layout wrap N corresponding to the end of the tape wrap N of the tape 122. Thus, starting at append point AP1, a sequence of interleaved code words which is data portion DP1, pad parity portion PP0, data portion DP2, parity portion PP1, data portion DP3, parity portion PP2, and data portion DP4, are assigned to layout wrap N.

In this example, the available layout space between the append point AP1 of the wrap N and the layout wrap end point $LWE_N$ of the layout wrap N is known. In addition, the size of each of the data blocks and parity blocks to be assigned to this space is known or may be calculated. Thus, the number of data and parity blocks which will fit in the available layout space between the append point AP1 of the wrap N and the layout wrap end point $LWE_N$ of the layout wrap N may be readily determined by the controller 128.

In one embodiment, the size of each of the data blocks and parity blocks is a function of one or more write operation parameters including the number of bits in each block, the type of tape cartridge employing the tape 122, the tape recording format including the types of bits in each block, and the tape recording density at which bits are recorded along the tape 122.

Accordingly, it may be determined as a function of one or more of these factors that the last portion to be assigned to a layout position before reaching the layout wrap end point $LWE_N$ of the layout wrap N, is the data portion DP4 of the sequence of portions to be assigned to the layout wrap N as shown in FIG. 7. Any data or parity portions assigned to wrap N locations after the layout wrap end point $LWE_N$ of the layout wrap N would exceed the allowable length of the wrap N at the end of the tape 122.

At the point at which the data portion DP4 has been assigned to the last location of the wrap N, the layout operation for the data write list 410 has not completed. Accordingly, after assigning the data portion DP4 to the last layout position of the layout wrap N, the layout operation for the data write list 410 continues in the reverse direction in the next-in-sequence layout wrap N+1 starting at layout wrap start point $LWS_{N+1}$. As noted above, in one embodiment, the generator 330 generates the write order list using a variable write order pattern to assign blocks of data and parity portions to tape layout positions. The write order pattern varies as appropriate to ensure that the blocks of the data and parity portions of the code words of the write list have the minimum specified spatial separation.

In this example, the write order pattern for assigning blocks of data and parity portions to tape layout positions changes for layout wrap N+1 such that the write order pattern no longer matches that of the write order pattern for tape wrap N+1 depicted in FIG. 6. Instead, the write order pattern changes to a different write order pattern for assigning data and parity portions to layout positions. More specifically this different write order pattern assigns in the following order, the data portion DP5, data portion DP6, data portion DP7, parity portion PP5, parity portion PP6, parity portion PP4, and parity portion PP3, in the reverse direction, to respective layout positions of layout wrap N+1 as depicted in FIG. 7. Following the layout position assigned to parity portion PP3, the write order pattern for assigning blocks of data and parity portions to tape layout positions can change again. For example, a selected write order pattern may revert to the write order pattern depicted in FIG. 6 for the tape wrap N+1. Accordingly, in this example, the data portion DP8 of FIG. 7 is assigned the layout position following (in the reverse direction) the layout position of the parity portion PP3, and the parity portion PP7 of the prior code word CW7 is assigned the layout position following (in the reverse direction) the layout position of the data portion DP8 as shown in FIG. 7.

The variable write order patterns of FIG. 7 maintain a minimum spatial separation of at least 1.5 units between the data portion and the parity portion of each of the code words of the data write list 410, where a spatial separation unit is the length of a data portion, in this example. Thus, the code word CW1 (FIG. 4) has a spacing of 1.5 units between the data portion DP1 and its parity portion PP1 of the code word CW1 as shown in FIG. 7. Moreover, the code word CW3 (FIG. 4) has a longitudinal spacing of 2.0 units between its data portion DP3 assigned to layout wrap N, and its parity portion PP3 assigned to layout wrap N+1 as compared to the longitudinal spacing of 1.0 for the data and parity portions of code word CW3 in the fixed write order pattern depicted in FIG. 6. As another example, the code word CW4 (FIG. 4) has a longitudinal spacing of 3.0 units between its data portion DP4 in layout wrap N, and its parity portion PP4 in layout wrap N+1 as compared to the longitudinal spacing of 0.5 units for its data and parity portions in the fixed write order pattern example of FIG. 6.

Thus by varying the write order pattern of code words to be written to tape, particularly in the vicinity of a transition from one wrap to the next wrap for an upcoming write operation, a minimum spatial separation may be maintained as described above. In one embodiment, if it is determined that both the data and parity portions of each code word may be assigned layout locations before the wrap end point is reached, the alternating interleaved write order pattern shown in FIG. 7 for wrap N may be selected for assigning these code word portions to the layout 710 to maintain the minimum spatial separation. Thus, for example, it may be determined that the data portion DP1 and parity portion PP1 of the code word CW1, and the data portion DP2 and parity PP2 of the code word CW2 are all assigned within the same layout wrap N before the end of wrap N is reached. As a result, the alternating interleaved write order pattern shown in FIG. 7 in layout wrap N may be selected for assigning these code word portions to the layout 710 to maintain the minimum spatial separation.

By comparison, if it is determined that the data and parity portions of particular code words are assigned to layout locations in different wraps, a different, modified write order pattern is selected as shown in FIG. 7 for these code word portions to maintain the minimum spatial separation. For example, if the data portion DP3 of the code word CW3, and the data portion DP4 of the code word CW4 are assigned to the wrap N whereas the parity portions PP3 and PP4 of the code words CW3 and CW4, respectively, are not assigned to the same wrap N but instead are assigned to the next wrap N+1, a different, modified write order pattern may be selected as shown in FIG. 7 to maintain the minimum spatial separation. By maintaining a minimum spatial separation such as least 1.5 units, for example, the likelihood that a media defect or servo track defect may prevent accurate reconstruction of an erasure encoded code word, may be decreased or eliminated.

The assignment of code word portions to layout positions as depicted in FIG. 7 facilitates the creation of a recommended write order list 332 (FIG. 3) which may be returned (block 230, FIG. 2) to the write order requestor, completing (block 240, FIG. 2) the operations of FIG. 2). Thus, in the example of FIG. 7, the layout 710 depicted therein defines a recommended write order list 332 (FIG. 3) identifying a particular write order for the write list 410 of FIG. 4. Accordingly, the tape drive controller 128 recommends (block 220, FIG. 2) to the write order requestor that when the portions or blocks of the code words of the code word write list 410 are sent to the tape drive 100 for writing to the tape 122, that the portions of the code word write list 410 be sent to the tape drive in the write list order specified by the generated write order list 332 defined by the layout 710 of FIG. 7, that is, in the order of data portion DP1, pad parity portion PP0, data portion DP2, parity portion PP1, data portion DP3, parity portion PP2, and data portion DP4, as assigned to layout wrap N, and the data portion DP5, data portion DP6, data portion DP7, parity portion PP5, parity portion PP6, parity portion PP4, and parity portion PP3, data portion DP8, parity portion PP7 etc., as assigned to wrap N+1 for writing the code word write list 410 to the tape 122. Writing the portions or blocks of the code words of the code word write list 410 in the recommended order helps ensure that the minimum spatial separation between the data portion and the parity portion of each code word is maintained when actually written to the tape. It is appreciated that other variable write order patterns may be employed for data write management in accordance with the present description.

Figure 8:
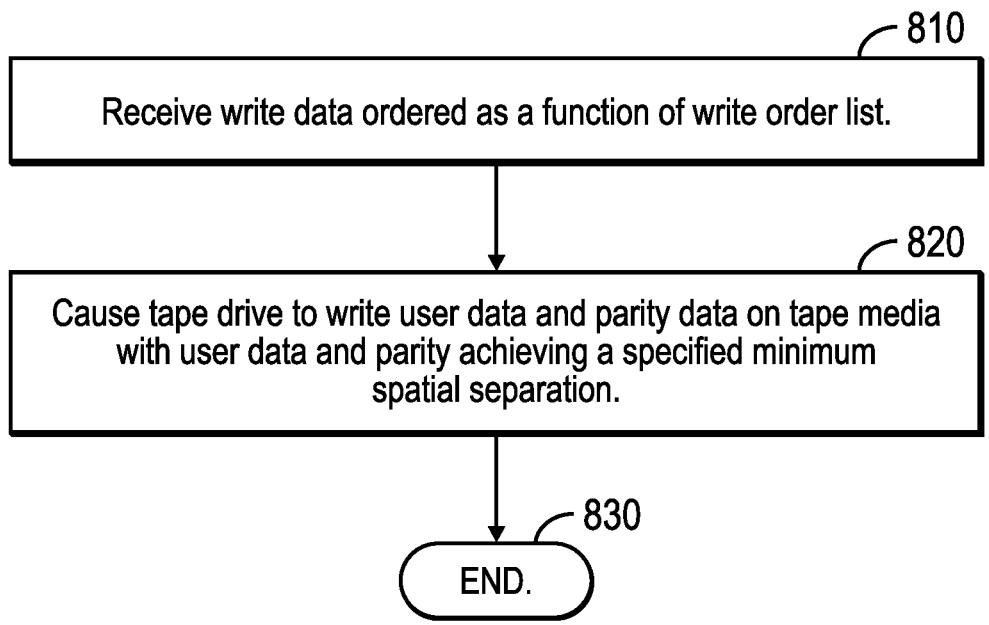
FIG. 8 is another example of operations of a controller employing write data management in accordance with one embodiment of the present disclosure.

FIG. 8 depicts another embodiment of operations of a controller of a data storage system to maintain a specified minimum spatial separation between data and parity portions of write code words. In this example, FIG. 8 depicts an example of operations of the tape drive controller 128 (FIG. 1) of a tape drive 100 employing one embodiment of write data management in accordance with the present description. It is appreciated that in other embodiments, the operations depicted in FIG. 8 may be carried out by one or more controllers of other computers such as a controller of the host computer 140 or a controller of a computer external to both the host 140 and the tape drive 100, for example.

The controller operations of FIG. 8 are represented by blocks 810-830 of FIG. 8. It is appreciated that the number and types of operations of a controller such as, for example, a tape drive controller 128 of a tape drive in accordance with embodiments of the present description, may vary, depending upon the particular application. Furthermore, operations may be performed in sequences other than those depicted in FIG. 8. For example, operations may be performed substantially in parallel, depending upon the particular application.

As shown in FIG. 8, a controller such as the tape drive controller 128, for example, receives (block 810, FIG. 8) the actual write data 340 (FIG. 3) which has been ordered by the host 140 or other computer in accordance with the recommended write order list 332 returned (block 230, FIG. 2) to the requestor of the recommended write order list as described above. The data transfer controller 350 of the tape drive controller 128 receiving the actual write data 340 ordered as a function of the recommended write order list 332, causes (block 820, FIG. 8) the actual write data to be written on the tape media 122 so that the data portions and parity portions of each code word of the actual data have the specified minimum spatial separation.

Figure 9:
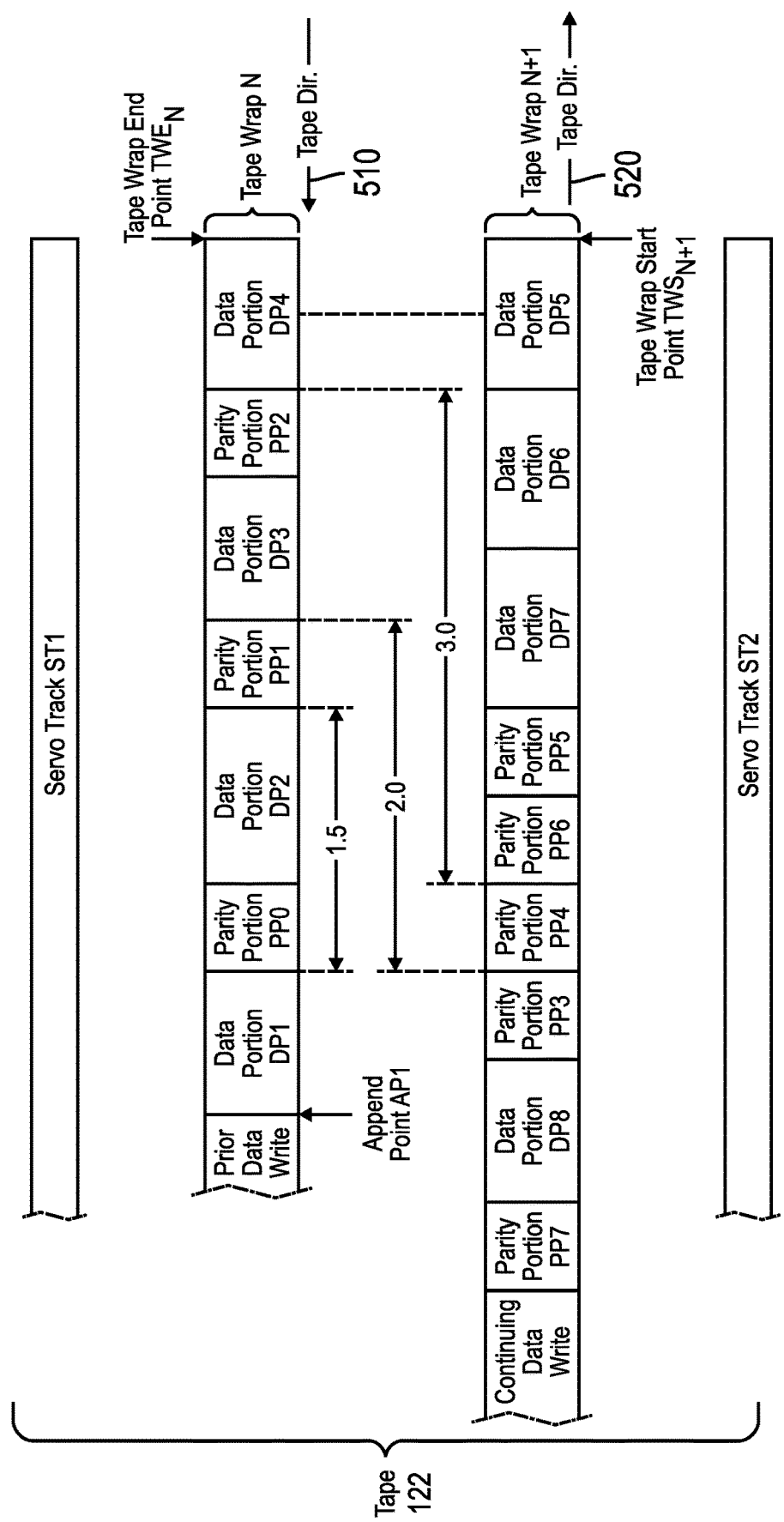
FIG. 9 is a schematic diagram of an example of data and parity portions of a data write list, written on a tape in accordance with the recommended write order layout of FIG. 7, in which data portions and parity portions have been ordered in a manner which maintains a minimum spatial separation between data and parity portions of the same code word, in accordance with an embodiment of write data management of the present description.

Thus, in the example of FIG. 8, the tape drive controller 128 receives (block 810, FIG. 8) the actual write data 340 (FIG. 3) of the code word list 410 (FIG. 4) which has been re-ordered from the order depicted in FIG. 4, to a different order as recommended by the recommended write order list (332) returned (block 230, FIG. 2) to the requestor of the recommended write order list. More specifically, when the portions or blocks of the code words of the code word write list 410 are received (block 810, FIG. 8) by the tape drive 100 for writing to the tape 122, the portions of the code word write list 410 are caused to be written (block 820, FIG. 8) on the tape 122 in the order determined in the layout 710 of FIG. 7, that is, in the following order: data portion DP1, pad parity portion PP0, data portion DP2, parity portion PP1, data portion DP3, parity portion PP2, and data portion DP4, in tape wrap N, and the data portion DP5, data portion DP6, data portion DP7, parity portion PP5, parity portion PP6, parity portion PP4, and parity portion PP3, data portion DP8, parity portion PP7 etc., assigned to tape wrap N+1 as shown in FIG. 9. Writing the portions or blocks of the code words of the code word write list 410 in the recommended write order helps ensure that the minimum spatial separation of 1.5 units between the data portion and the parity portion of each code word is maintained when actually written to the tape, as shown in FIG. 9

In one embodiment, the transmitter of the actual write data re-ordered in accordance with the recommended write order list, may be a host such as the host 140 (FIG. 1), for example. It is appreciated that in other embodiments, the source of the actual write data re-ordered in accordance with the recommended write order list, may be a computer other than the host computer 140 such as a controller of a computer external to both the host 140 and the tape drive 100, for example.

Figure 10:
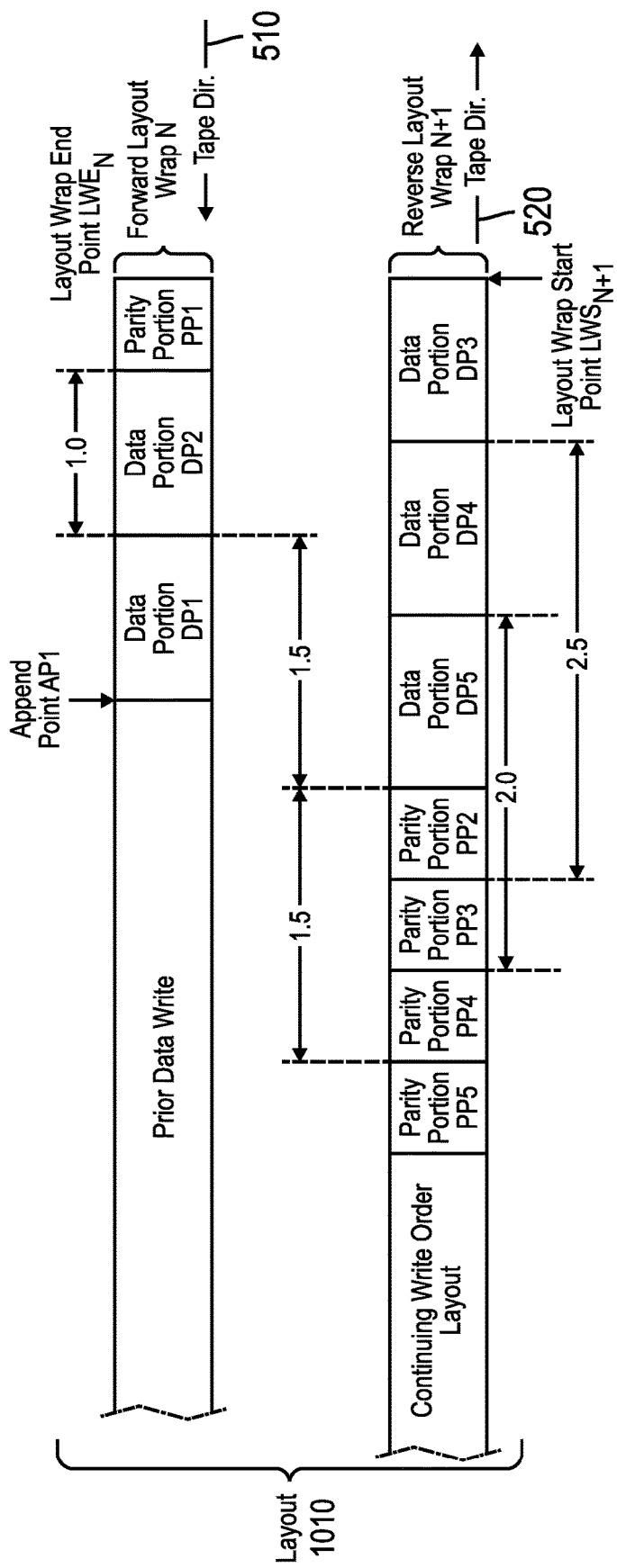
FIGS. 10, 10A are schematic diagrams of another example of a recommended write order layout in which data portions and parity portions have been ordered in a manner which maintains a minimum spatial separation between data and parity portions of the same code word, in accordance with an embodiment of write data management of the present description.

FIG. 10 depicts another example of a layout of a variable write order pattern in which the data and parity portions of the code words of the code word write list 410 (FIG. 4) have been assigned to positions of a layout 1010 which ensures that the blocks of the data and parity portions of the code words of the write list have a minimum specified spatial separation when subsequently written on the tape 122. In this example, the minimum specified spatial separation is 1.0 units which is the length of each data portion of the code word list 410 (FIG. 4). It is appreciated that other minimum spatial separations may be specified, depending upon the particular application.

In a manner similar to that of the layout of FIG. 7, data and parity portions of the code words of the data write list 410 are assigned to positions of the layout 1010 starting in the wrap N of the layout 710 at append point AP1. In contrast to the examples in FIG. 7 and FIG. 9, the example of FIG. 10 does not reorder the sequence of data portions, i.e. data portion DPn is laid out in a layout position after the layout position of data portion DPn−1 and before the layout position of the data portion DPn+1 of the sequence of data portions. Furthermore, the sequence of parity portions is not reordered either, i.e. parity portion PPn is laid out in a layout position after the layout position of parity portion PPn−1 and before the layout position of parity portion PPn+1 of the sequence of parity portions of the sequence of code words. Instead, the example of FIG. 10 uses a variable interleaving between data and parity portions to guarantee the minimum specified spatial separation of 1.0 while maintaining the sequential ordering of the data portions and the sequential ordering of the parity portions.

Figure 11:
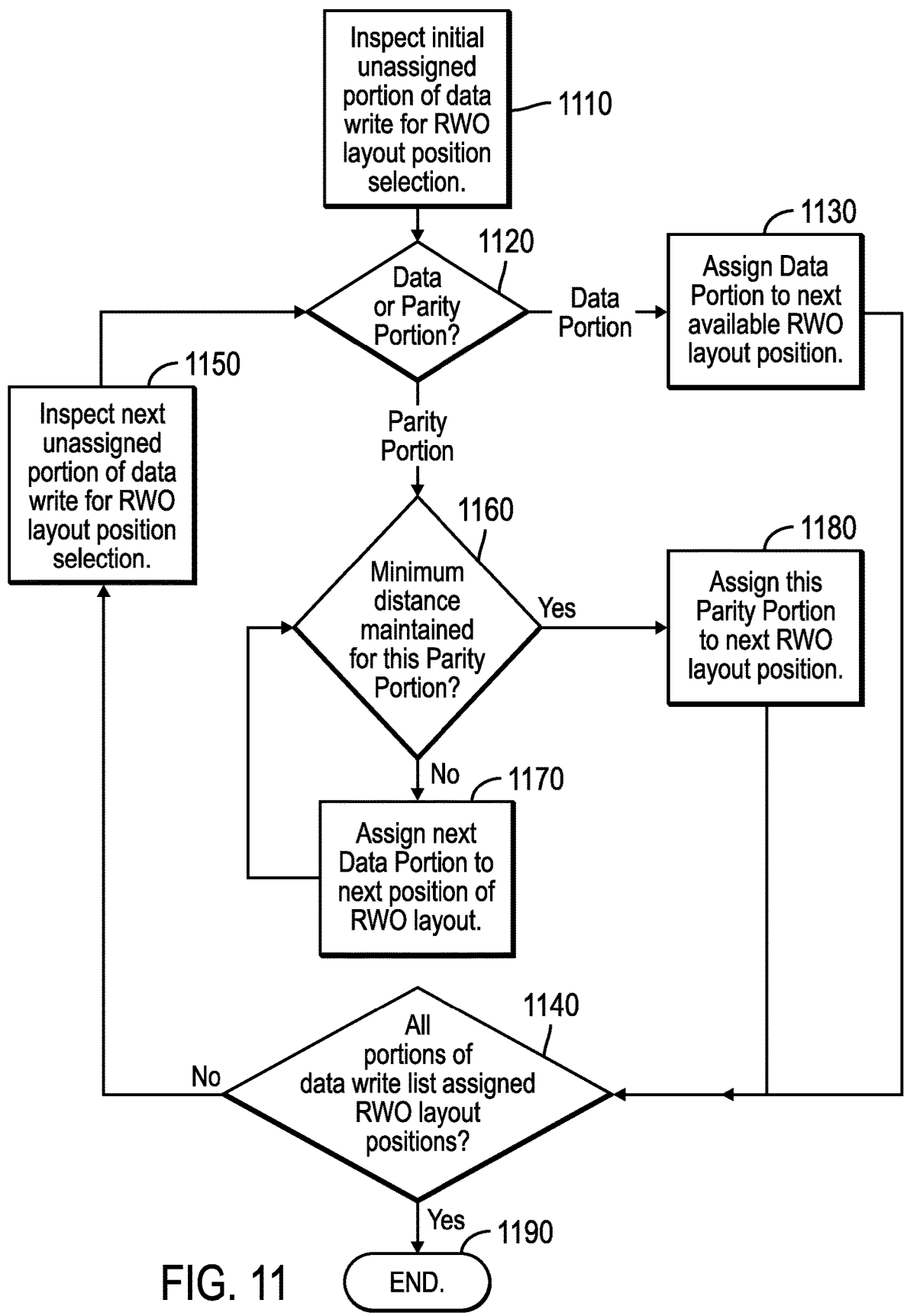
FIG. 11 is another example of operations of a controller employing write data management in accordance with one embodiment of the present disclosure, for generating the recommended write order layout of FIG. 10.

FIG. 11 depicts one example of operations of a recommended write list generator 330 (FIG. 3) of a controller of a data storage system, for assigning the data and parity portions of the code words of a code word write list such as the code word write list 410 (FIG. 4), for example, to positions of a layout such as the layout 1010 (FIG. 10) in a manner which ensures that the blocks of the data and parity portions of the code words of the write list have a minimum specified spatial separation when subsequently written on the tape 122. In one embodiment, FIG. 11 depicts an example of operations of the tape drive controller 128 (FIG. 1) of a tape drive 100 employing an embodiment of write data management in accordance with the present description. It is appreciated that in other embodiments, the operations depicted in FIG. 11 may be carried out by one or more controllers of other computers such as a controller of the host computer 140 or a controller of a computer external to both the host 140 and the tape drive 100, for example.

The controller operations of FIG. 11 are represented by blocks 1110-1190 of FIG. 11. It is appreciated that the number and types of operations of a controller such as, for example, a tape drive controller 128 of a tape drive in accordance with embodiments of the present description, may vary, depending upon the particular application. Furthermore, operations may be performed in sequences other than those depicted in FIG. 11. For example, operations may be performed substantially in parallel, depending upon the particular application.

As shown in FIG. 11, a controller such as the tape drive controller 128, for example, inspects (block 1110, FIG. 11) an initial unassigned portion of a data write list for purposes of recommended write order layout position selection. A determination (block 1120, FIG. 11) is made as to whether this unassigned portion is a data portion or a parity portion of a code word of the write list. In this example, the initial unassigned portion of the data write list 410 is the data portion DP1 of the code word CW1. Accordingly, it is determined (block 1120, FIG. 11) that this unassigned data portion DP1 is a data portion and as a result, is assigned (block 1130, FIG. 11) to the next available recommended write list layout position as shown in FIG. 10. In this example, the next available recommended write list layout position is the first layout position following the append point APL. As set forth below, data and parity portions of the code words of the data write list 410 are assigned to layout positions in layout wrap N of the layout 1010 starting at an append point AP1 and continues in a particular write order pattern to the layout wrap end point LWE$_N$ of the layout wrap N corresponding to the end of the tape wrap N of the tape 122. In one embodiment, this write order pattern changes with the assigning of data and parity portions to the next in sequence layout wrap N+1, to maintain the specified minimum spatial separation.

A determination is then made (block 1140, FIG. 11) as to whether all portions of the data write list have been assigned recommended write order layout positions. In this example, it is determined that not all portions of the data write list have been assigned recommended write order layout positions. Accordingly, the next unassigned portion of the data write list is inspected (block 1150, FIG. 11) for purposes of recommended write order layout position selection. In this example, the next unassigned portion of the data write list 410 is the parity portion PP1 of the code word CW1. A determination (block 1120, FIG. 11) is again made as to whether this unassigned portion is a data portion or a parity portion of a code word of the write list. In this example, the parity portion PP1 of the code word CW1 is determined (block 1120, FIG. 11) to be a parity portion. Accordingly, a determination is made (block 1160, FIG. 11) as to whether assigning the parity portion PP1 to the next available recommended write order layout position would maintain the specified minimum spatial separation. In this example, it is determined (block 1160, FIG. 11) that assigning the parity portion PP1 to the next available recommended write order layout position would not maintain the specified minimum spatial separation from the previously assigned data portion DP1, and accordingly, the next unassigned data portion which is data portion DP2 in this example, is assigned (block 1170, FIG. 11) to the next available position of the recommended write order layout as shown in FIG. 10, instead of assigning the parity portion PP1 to this position.

A determination is again made (block 1160, FIG. 11) as to whether assigning the parity portion PP1 to the next available recommended write order layout position would maintain the specified minimum spatial separation. After assigning (block 1170, FIG. 11) the data portion DP2 to the layout position following the data portion DP1 as described above, it may now be determined (block 1160, FIG. 11) that assigning the parity portion PP1 to the next available recommended write order layout position following the data portion DP2 position would maintain the specified minimum spatial separation of 1.0 units from the previously assigned data portion DP1. Accordingly, the parity portion PP1 can be assigned (block 1180, FIG. 11) to the next available position of the recommended write order layout as shown in FIG. 10, which position follows the data portion DP2. As shown in FIG. 10, the parity portion PP1 is separated from the data portion DP1 of the same code word CW1, by a longitudinal spacing of 1.0 units, which matches the specified minimum spatial separation. With the assigning of the parity portion PP1, the layout wrap end point LWE$_N$ of the layout wrap N has been reached such that there are no additional available positions in wrap N of the recommended write order layout as shown in FIG. 10. Accordingly, any additional portions of the write list to be assigned are assigned layout positions in the next wrap N+1. As explained below, the write order pattern of assignments changes in the next wrap N+1 from that used in wrap N to maintain the minimum spatial separation of code word data and parity portions.

More specifically, a determination is made (block 1140, FIG. 11) as to whether all portions of the data write list have been assigned recommended write order layout positions. In this example, following the assignment of the parity portion PP1, it is seen from FIG. 4 that not all portions of the data write list 410 have been assigned recommended write order layout positions. Accordingly, as described below, the remaining unassigned portions of the data write list 410 are assigned layout positions beginning at the layout wrap start point LWS$_{N+1}$ (FIG. 10) at the beginning of the next layout wrap N+1 and in the reverse direction as compared to the forward direction of layout wrap N described above.

More specifically, in this example, the next unassigned portion of the data write list is inspected (block 1150, FIG. 11) for purposes of recommended write order layout position selection. In this example, following the assignment of the parity portion PP1 as described above, the next unassigned portion of the data write list 410 is the parity portion PP2 of the code word CW2. A determination (block 1120, FIG. 11) is made as to whether this unassigned portion is a data portion or a parity portion of a code word of the write list. In this example, the parity portion PP2 of the code word CW2 is determined (block 1120, FIG. 11) to be a parity portion. It is apparent from FIG. 10 that assigning the parity portion PP2 to the next available recommended write order layout position beginning at the layout wrap start point LWS$_{N+1}$ (FIG. 10) at the beginning of the next layout wrap N+1 and in the reverse direction, would not maintain the specified minimum spatial separation from the previously assigned data portion DP2 of the same code word CW2 and assigned to layout wrap N. Accordingly, it is determined (block 1160, FIG. 11) by the generator 330 (FIG. 3) of the controller 128, that assigning the parity portion PP2 to the next available recommended write order layout position (beginning at the layout wrap start point $LWS_{N+1}$ (FIG. 10)) would not maintain the specified minimum spatial separation from the previously assigned data portion DP2 of the same code word CW2. As a result, the next unassigned data portion which is data portion DP3 in this example, is assigned (block 1170, FIG. 11) to the next available layout position which is at the beginning of the next layout wrap N+1 of the recommended write order layout as shown in FIG. 10, instead of assigning the parity portion PP2 to this position.

A determination is again made (block 1160, FIG. 11) as to whether assigning the parity portion PP2 to the next available recommended write order layout position would maintain the specified minimum spatial separation. It is apparent from FIG. 10 that assigning the parity portion PP2 to the next available recommended write order layout position following (in the reverse direction), the position of the data portion DP3 (FIG. 10), would again not maintain the specified minimum spatial separation from the previously assigned data portion DP2 of the same code word CW2 and assigned to prior layout wrap N. As a result, the next unassigned data portion which is data portion DP4 in this example, is assigned (block 1170, FIG. 11) to the next available position which is following in the reverse direction, the position of the data portion DP3 (FIG. 10), instead of assigning the parity portion PP2 to this position.

A determination is again made (block 1160, FIG. 11) as to whether assigning the parity portion PP2 to the next available recommended write order layout position would maintain the specified minimum spatial separation. In this example, the next available recommended write order layout position follows (in the reverse direction) the layout position of the data portion DP4 as shown in FIG. 10. It is apparent from FIG. 10 that assigning the parity portion PP2 to the next available recommended write order layout position following in the reverse direction, the position of the data portion DP4 (FIG. 10) would again not maintain the specified minimum spatial separation from the previously assigned data portion DP2 of the same code word CW2 and assigned to layout wrap N. As a result, the next unassigned data portion which is data portion DP5 in this example, is assigned (block 1170, FIG. 11) to the next available position following (in the reverse direction), the position of the data portion DP4 (FIG. 10), instead of assigning the parity portion PP2 to this position.

A determination is again made (block 1160, FIG. 11) as to whether assigning the parity portion PP2 to the next available recommended write order layout position would maintain the specified minimum spatial separation. In this example, the next available recommended write order layout position follows (in the reverse direction) the layout position of the data portion DP5 assigned to the layout as described above. After assigning (block 1170, FIG. 11) the data portion DP5 to the layout position following the layout position of the data portion DP4 as described above, it may now be determined (block 1160, FIG. 11) that assigning the parity portion PP2 to the next available recommended write order layout position (which follows in the reverse direction the layout position of the data portion DP5) would maintain the specified minimum spatial separation from the previously assigned data portion DP2 of the same code word CW2. Accordingly, the parity portion PP2 can be assigned (block 1180, FIG. 11) to the next available position of the recommended write order layout as shown in FIG. 10, which position follows the data portion DP5. As shown in FIG. 10, the parity portion PP2 is separated from the data portion DP2 of the same code word CW2, by a longitudinal spacing of 1.5 units, which exceeds the specified minimum spatial separation.

A determination is then made (block 1140, FIG. 11) as to whether all portions of the data write list have been assigned recommended write order layout positions. In this example, following the assignment of the parity portion PP2, it is seen from FIG. 4 that not all portions of the data write list 410 have been assigned recommended write order layout positions.

Accordingly, the next unassigned portion of the data write list is inspected (block 1150, FIG. 11) for purposes of recommended write order layout position selection. In this example, following the assignment of the parity portion PP2 as described above, the next unassigned portion of the data write list 410 is the parity portion PP3 of the code word CW3. A determination (block 1120, FIG. 11) is made as to whether this unassigned portion is a data portion or a parity portion of a code word of the write list. In this example, the parity portion PP3 of the code word CW3 is determined (block 1120, FIG. 11) to be a parity portion. Accordingly, a determination is made (block 1160, FIG. 11) as to whether assigning the parity portion PP3 to the next available recommended write order layout position would maintain the specified minimum spatial separation.

In this example, the next available recommended write order layout position follows (in the reverse direction) the layout position of the parity portion PP2 assigned to the layout as described above. After assigning (block 1170, FIG. 11) the parity portion PP2 to the layout position following the layout position of the data portion DP5 as described above, it may now be determined (block 1160, FIG. 11) that assigning the parity portion PP3 to the next available recommended write order layout position (which follows in the reverse direction the layout position of the parity portion PP2) would maintain the specified minimum spatial separation from the previously assigned data portion DP3 of the same code word CW3. Accordingly, the parity portion PP3 can be assigned (block 1180, FIG. 11) to the next available position of the recommended write order layout as shown in FIG. 10, which position follows the parity portion PP2. As shown in FIG. 10, the parity portion PP3 is separated from the data portion DP3 of the same code word CW3, by a longitudinal spacing of 2.5 units, which exceeds the specified minimum spatial separation.

A determination is again made (block 1140, FIG. 11) as to whether all portions of the data write list have been assigned recommended write order layout positions. In this example, following the assignment of the parity portion PP3, it is seen from FIG. 4 that not all portions of the data write list 410 have been assigned recommended write order layout positions.

Accordingly, the next unassigned portion of the data write list is inspected (block 1150, FIG. 11) for purposes of recommended write order layout position selection. In this example, following the assignment of the parity portion PP3 as described above, the next unassigned portion of the data write list 410 is the parity portion PP4 of the code word CW4. A determination (block 1120, FIG. 11) is made as to whether this unassigned portion is a data portion or a parity portion of a code word of the write list. In this example, the parity portion PP4 of the code word CW4 is determined (block 1120, FIG. 11) to be a parity portion. Accordingly, a determination is made (block 1160, FIG. 11) as to whether assigning the parity portion PP4 to the next available recommended write order layout position would maintain the specified minimum spatial separation.

In this example, the next available recommended write order layout position follows (in the reverse direction) the layout position of the parity portion PP3 assigned to the layout as described above. After assigning (block 1170, FIG. 11) the parity portion PP3 to the layout position following the layout position of the parity portion PP2 as described above, it may now be determined (block 1160, FIG. 11) that assigning the parity portion PP4 to the next available recommended write order layout position (which follows in the reverse direction the layout position of the parity portion PP3) would maintain the specified minimum spatial separation from the previously assigned data portion DP4 of the same code word CW4. Accordingly, the parity portion PP4 can be assigned (block 1180, FIG. 11) to the next available position of the recommended write order layout as shown in FIG. 10, which position follows the layout position of the parity portion PP3. As shown in FIG. 10, the parity portion PP4 is separated from the data portion DP4 of the same code word CW4, by a longitudinal spacing of 2.0 units, which exceeds the specified minimum spatial separation.

A determination is again made (block 1140, FIG. 11) as to whether all portions of the data write list have been assigned recommended write order layout positions. In this example, following the assignment of the parity portion PP4, it is seen from FIG. 4 that not all portions of the data write list 410 have been assigned recommended write order layout positions.

Accordingly, the next unassigned portion of the data write list is inspected (block 1150, FIG. 11) for purposes of recommended write order layout position selection. In this example, following the assignment of the parity portion PP4 as described above, the next unassigned portion of the data write list 410 is the parity portion PP5 of the code word CW5. A determination (block 1120, FIG. 11) is made as to whether this unassigned portion is a data portion or a parity portion of a code word of the write list. In this example, the parity portion PP5 of the code word CW5 is determined (block 1120, FIG. 11) to be a parity portion. Accordingly, a determination is made (block 1160, FIG. 11) as to whether assigning the parity portion PP5 to the next available recommended write order layout position would maintain the specified minimum spatial separation.

In this example, the next available recommended write order layout position follows (in the reverse direction) the layout position of the parity portion PP4 assigned to the layout as described above. After assigning (block 1170, FIG. 11) the parity portion PP4 to the layout position following the layout position of the parity portion PP3 as described above, it may now be determined (block 1160, FIG. 11) that assigning the parity portion PP5 to the next available recommended write order layout position (which follows in the reverse direction the layout position of the parity portion PP4) would maintain the specified minimum spatial separation from the previously assigned data portion DP5 of the same code word CW5. Accordingly, the parity portion PP5 can be assigned (block 1180, FIG. 11) to the next available position of the recommended write order layout as shown in FIG. 10, which position follows the layout position of the parity portion PP4. As shown in FIG. 10, the parity portion PP5 is separated from the data portion DP5 of the same code word CW5, by a longitudinal spacing of 1.5 units, which exceeds the specified minimum spatial separation.

It is seen from FIG. 10 and the above discussion that the data and parity portions of the code words are assigned layout positions in the initial portion of a wrap N+1 following a write order pattern which differs from the ending portion of the prior wrap N. As explained in greater detail below, the write order pattern can change again for the assignment of the remaining portions of the code words of the write list.

More specifically, in one embodiment, a determination is again made (block 1140, FIG. 11) as to whether all portions of the data write list have been assigned recommended write order layout positions. In this example, the code words of the data write list 410 (FIG. 4) as represented by the code word CWn, have not yet been assigned recommended write order layout positions. For example, the data write list 410 may further include code words CW6 having a data portion DP6 and a parity portion PP6, a code word CW7 having a data portion DP7 and a parity portion PP7, . . . code word CWn having a data portion DPn and a parity portion PPn.

Figure 10A:
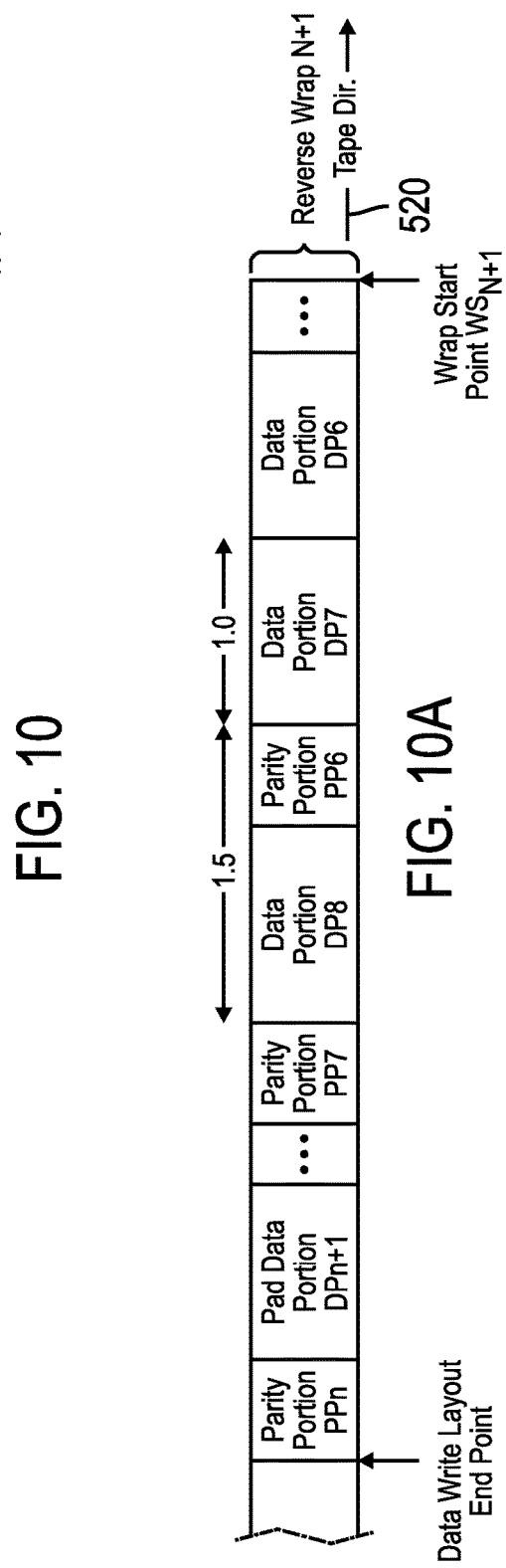

Returning to FIG. 11, the next unassigned portion of the data write list is inspected (block 1150, FIG. 11) for purposes of recommended write order layout position selection. In this example, the next unassigned portion of the data write list 410 is the data portion DP6 of the code word CW6. Accordingly, it is determined (block 1120, FIG. 11) that this unassigned data portion DP6 is a data portion and as a result, is assigned (block 1130, FIG. 11) to the next available recommended write list layout position as shown in FIG. 10A. In this example, the next available recommended write list layout position follows, in the reverse direction, the layout position of the previously assigned parity portion PP5 (FIG. 10).

A determination is then made (block 1140, FIG. 11) as to whether all portions of the data write list have been assigned recommended write order layout positions. In this example, not all portions of the data write list have been assigned recommended write order layout positions. Accordingly, the next unassigned portion of the data write list is inspected (block 1150, FIG. 11) for purposes of recommended write order layout position selection. In this example, the next unassigned portion of the data write list 410 is the parity portion PP6 of the code word CW6. A determination (block 1120, FIG. 11) is made as to whether this unassigned portion is a data portion or a parity portion of a code word of the write list. In this example, the parity portion PP6 of the code word CW6 is determined (block 1120, FIG. 11) to be a parity portion. Accordingly, a determination is made (block 1160, FIG. 11) as to whether assigning the parity portion PP6 to the next available recommended write order layout position would maintain the specified minimum spatial separation. Here it is determined (block 1160, FIG. 11) that assigning the parity portion PP6 to the next available recommended write order layout position would not maintain the specified minimum spatial separation from the previously assigned data portion DP6. As a result, the next unassigned data portion which is data portion DP7 in this example, is assigned (block 1170, FIG. 11) to the next available position of the recommended write order layout as shown in FIG. 10A, instead of assigning the parity portion PP6 to this position.

A determination is again made (block 1160, FIG. 11) as to whether assigning the parity portion PP6 to the next available recommended write order layout position would maintain the specified minimum spatial separation. After assigning (block 1170, FIG. 11) the data portion DP7 to the layout position following the data portion DP6 as described above, it may now be determined (block 1160, FIG. 11) that assigning the parity portion PP6 to the next available recommended write order layout position following the data portion DP7 position would maintain the specified minimum spatial separation from the previously assigned data portion DP1. Accordingly, the parity portion PP6 can be assigned (block 1180, FIG. 11) to the next available position of the recommended write order layout as shown in FIG. 10A, which position follows in the reverse direction, the layout position of the data portion DP7. As shown in FIG. 10A, the parity portion PP6 is separated from the data portion DP6 of the same code word CW6, by a longitudinal spacing of 1.0 units, which matches the specified minimum spatial separation.

A determination is then made (block 1140, FIG. 11) as to whether all portions of the data write list have been assigned recommended write order layout positions. In this example, following the assignment of the parity portion PP6, not all portions of the data write list 410 have been assigned recommended write order layout positions.

Accordingly, the next unassigned portion of the data write list is inspected (block 1150, FIG. 11) for purposes of recommended write order layout position selection. In this example, the next unassigned portion of the data write list 410 is the parity portion PP7 of the code word CW7. A determination (block 1120, FIG. 11) is made as to whether this unassigned portion is a data portion or a parity portion of a code word of the write list. In this example, the parity portion PP7 of the code word CW76 is determined (block 1120, FIG. 11) to be a parity portion. Accordingly, a determination is made (block 1160, FIG. 11) as to whether assigning the parity portion PP7 to the next available recommended write order layout position would maintain the specified minimum spatial separation. Here it is determined (block 1160, FIG. 11) that assigning the parity portion PP7 to the next available recommended write order layout position would not maintain the specified minimum spatial separation from the previously assigned data portion DP7. As a result, the next unassigned data portion which is data portion DP8 in this example, is assigned (block 1170, FIG. 11) to the next available position of the recommended write order layout as shown in FIG. 10A, instead of assigning the parity portion PP7 to this position.

A determination is again made (block 1160, FIG. 11) as to whether assigning the parity portion PP7 to the next available recommended write order layout position would maintain the specified minimum spatial separation. After assigning (block 1170, FIG. 11) the data portion DP8 to the layout position following the parity portion DP6 as described above, it may now be determined (block 1160, FIG. 11) that assigning the parity portion PP7 to the next available recommended write order layout position following the data portion DP8 position would maintain the specified minimum spatial separation from the previously assigned data portion DP7. Accordingly, the parity portion PP7 can be assigned (block 1180, FIG. 11) to the next available position of the recommended write order layout as shown in FIG. 10A, which position follows the data portion DP8. As shown in FIG. 10A, the parity portion PP7 is separated from the data portion DP7 of the same code word CW71, by a longitudinal spacing of 1.5 units, which exceeds the specified minimum spatial separation of 1.0 units in this example.

It is noted that the layout position of the parity portion PP7 is longitudinally separated from the layout position of the data portion DP7 of the same code word CW7 by the space of the layout position of the parity portion PP6 of the prior in sequence code word CW6, combined with the space of the layout position of the data portion DP8 of the next in sequence code word CW8, for a total longitudinal separation of 1.5 units as set forth above. This interleaved layout assignment pattern of assigning a data portion of a particular code word to a layout position, followed by assigning a parity portion of the prior in sequence code word to the following layout position, followed by assigning a data portion of the next in sequence code word, and followed by assigning a parity portion of the particular code word to the following layout position, may be repeated in a write order pattern until all the remaining portions of the code word list have been assigned to remaining layout positions of the layout wrap or until the end of wrap N+1 is reached. If the end of wrap N+1 is reached prior to assigning all the code words of the write list to the layout, the write order patterns of wrap N+1 may be repeated for the layout of the next wrap N+2, but in the forward direction. Assignment of data and parity portions to layout positions continues in this manner until all portions of all code words of the write list have been assigned layout positions which maintain the specified minimum spatial separation between data and parity portions of the same code word.

Once it is determined that all portions of the data write list have been assigned recommended write order layout positions, the assignment of layout positions to the portions of the data write list ends (block 1190, FIG. 11). The tape drive controller 128 then recommends (block 220, FIG. 2) to the write order requestor in the form of the write order list 332 (FIG. 3) that when the portions or blocks of the code words of the code word write list 410 are sent (block 810, FIG. 8) to the tape drive 100 for writing to the tape 122, that the portions of the code word write list 410 be sent to the tape drive in the order laid out in the layout 1010 of FIGS. 10, 10A. As described above, writing the portions or blocks of the code words of the code word write list 410 in the recommended order helps ensure that the minimum spatial separation of the data portion and the parity portion of each code word is maintained when actually written to the tape.

It is noted that the layout of FIG. 10 and the write order list 332 based upon the layout of FIG. 10, maintains the sequential order of the data portions, that is, the sequential order of data portion DP1, DP2, . . . DPn is maintained. In addition, the sequential order of the parity portions, that is, the sequential order of parity portions PP1, PP2 . . . PPn is also maintained. The sequentially ordered data portions and sequentially ordered parity portions are interleaved in variable write patterns to maintain the specified minimum spatial separation as discussed above. It is appreciated that other variable write patterns, including non-sequential variable write patterns may be employed depending upon the particular application.

Figure 12:
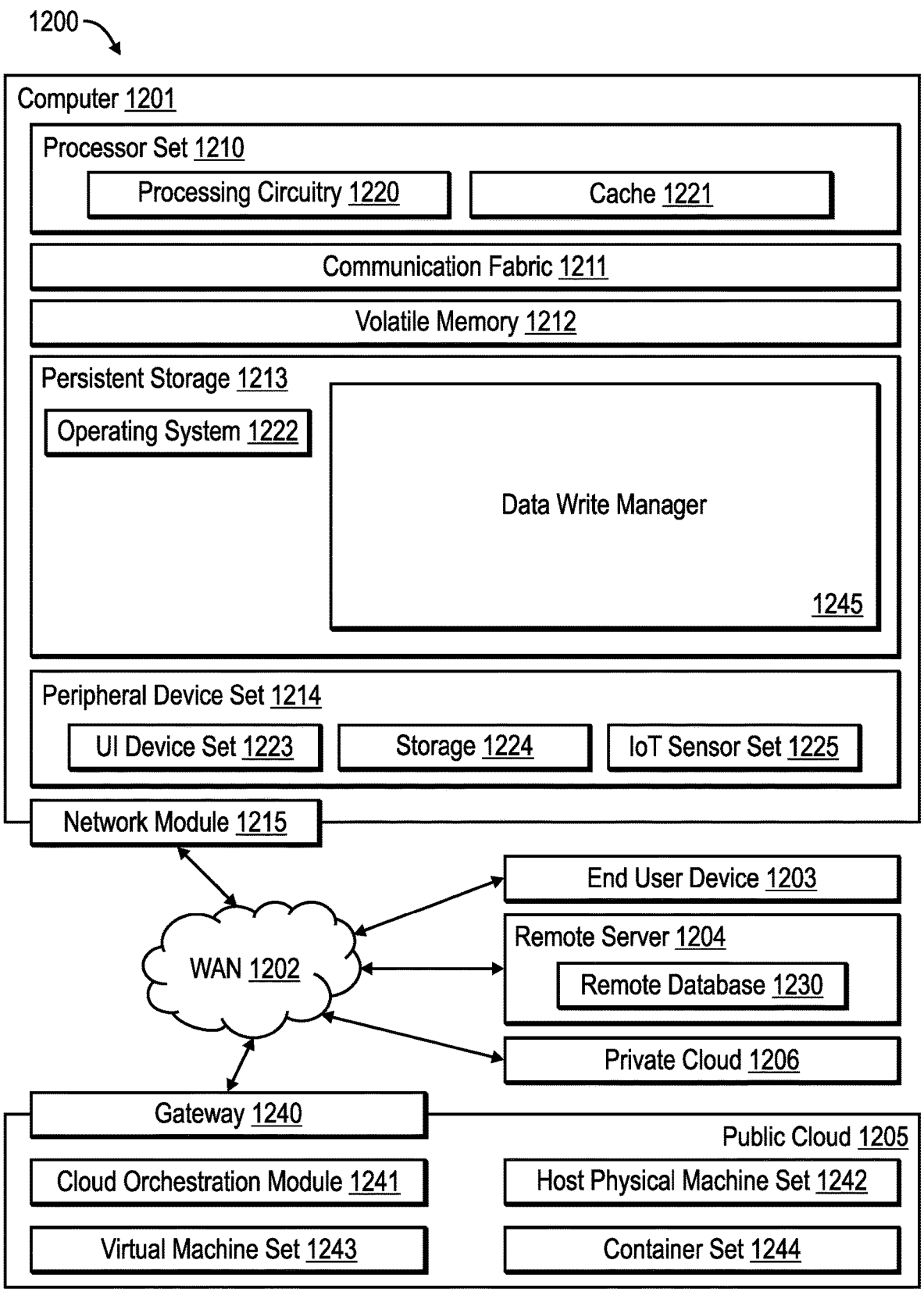
FIG. 12 illustrates a computing environment employing write data management in accordance with the present description may be implemented.

FIG. 12 depicts a computing environment 1200 which contains an example of an environment for the execution of at least some of the computer code involved in performing the inventive methods, including write data management in accordance with the present description. Computing environment 1200 includes, for example, computer 1201, wide area network (WAN) 1202, end user device (EUD) 1203, remote server 1204, public cloud 1205, and private cloud 1206. In this embodiment, computer 1201 includes processor set 1210 (including processing circuitry 1220 and cache 1221), communication fabric 1211, volatile memory 1212, persistent storage 1213 (including operating system 1222 and block 1201, as identified above), peripheral device set 1214 (including user interface (UI) device set 1223, storage 1224, and Internet of Things (IoT) sensor set 1225), and network module 1215. Remote server 1204 includes remote database 1230. Public cloud 1205 includes gateway 1240, cloud orchestration module 1241, host physical machine set 1242, virtual machine set 1243, and container set 1244.

COMPUTER 1201 may take the form of a desktop computer, laptop computer, tablet computer, smart phone, smart watch or other wearable computer, server, mainframe computer, quantum computer or any other form of computer or mobile device now known or to be developed in the future that is capable of running a program, accessing a network or querying a database, such as remote database 1230. For instance, the computer 1201 may comprise the tape drive controller 128 FIGS. 1, 3 (FIG. 1), or the host 140 (FIG. 1) or computer external to the tape drive 100 or the host 140, alone or in combination. As is well understood in the art of computer technology, and depending upon the technology, performance of a computer-implemented method may be distributed among multiple computers and/or between multiple locations. On the other hand, in this presentation of computing environment 1200, detailed discussion is focused on a single computer, specifically computer 1201, to keep the presentation as simple as possible. Computer 1201 may be located in a cloud, even though it is not shown in a cloud in FIG. 12. On the other hand, computer 1201 is not required to be in a cloud except to any extent as may be affirmatively indicated.

PROCESSOR SET 1210 includes one, or more, computer processors of any type now known or to be developed in the future. Processing circuitry 1220 may be distributed over multiple packages, for example, multiple, coordinated integrated circuit chips. Processing circuitry 1220 may implement multiple processor threads and/or multiple processor cores. Cache 1221 is memory that is located in the processor chip package(s) and is typically used for data or code that should be available for rapid access by the threads or cores running on processor set 1210. Cache memories are typically organized into multiple levels depending upon relative proximity to the processing circuitry. Alternatively, some, or all, of the cache for the processor set may be located "off chip." In some computing environments, processor set 1210 may be designed for working with qubits and performing quantum computing.

Computer readable program instructions are typically loaded onto computer 1201 to cause a series of operational steps to be performed by processor set 1210 of computer 1201 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1221 and the other storage media discussed below. The program instructions, and associated data, are accessed by processor set 1210 to control and direct performance of the inventive methods. In computing environment 101, at least some of the instructions for performing the inventive methods may be stored in persistent storage 1213.

COMMUNICATION FABRIC 1211 is the signal conduction path that allows the various components of computer 1201 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 1212 is any type of volatile memory now known or to be developed in the future. Examples include dynamic type random access memory (RAM) or static type RAM. Typically, volatile memory 1212 is characterized by random access, but this is not required unless affirmatively indicated. In computer 1201, the volatile memory 1212 is located in a single package and is internal to computer 1201, but, alternatively or additionally, the volatile memory may be distributed over multiple packages and/or located externally with respect to computer 1201.

PERSISTENT STORAGE 1213 is any form of non-volatile storage for computers that is now known or to be developed in the future. The non-volatility of this storage means that the stored data is maintained regardless of whether power is being supplied to computer 1201 and/or directly to persistent storage 1213. Persistent storage 1213 may be a read only memory (ROM), but typically at least a portion of the persistent storage allows writing of data, deletion of data and re-writing of data. Some familiar forms of persistent storage include magnetic disks and solid-state storage devices. Operating system 1222 may take several forms, such as various known proprietary operating systems or open-source Portable Operating System Interface-type operating systems that employ a kernel. In one embodiment, components of data write manager 1245 in accordance with the present description, includes at least some of the computer code involved in performing the inventive methods, including program components of the controller 128 (FIG. 3) of the tape drive 100 (FIG. 1).

PERIPHERAL DEVICE SET 1214 includes the set of peripheral devices of computer 1201. Data communication connections between the peripheral devices and the other components of computer 1201 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 1223 may include components such as a display screen, speaker, microphone, wearable devices (such as goggles and smart watches), keyboard, mouse, printer, touchpad, game controllers, and haptic devices. Storage 1224 includes in one embodiment a tape library such as the tape library 101 (FIG. 1). Storage 1224 may also include other external storage, such as an external hard drive, or insertable storage, such as an SD card. Storage 1224 may be persistent and/or volatile. In some embodiments, storage 1224 may include a quantum computing storage device for storing data in the form of qubits. In embodiments where computer 1201 is required to have a large amount of storage (for example, where computer 1201 locally stores and manages a large database) then this storage may be provided by peripheral storage devices designed for storing very large amounts of data, such as a storage area network (SAN) that is shared by multiple, geographically distributed computers. IoT sensor set 1225 is made up of sensors that can be used in Internet of Things applications. For example, one sensor may be a thermometer and another sensor may be a motion detector.

NETWORK MODULE 1215 is the collection of computer software, hardware, and firmware that allows computer 1201 to communicate with other computers through WAN 1202. Network module 1215 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1215 are performed on the same physical hardware device. In other embodiments (for example, embodiments that utilize software-defined networking (SDN)), the control functions and the forwarding functions of network module 1215 are performed on physically separate devices, such that the control functions manage several different network hardware devices. Computer readable program instructions for performing the inventive methods can typically be downloaded to computer 1201 from an external computer or external storage device through a network adapter card or network interface included in network module 1215.

WAN 1202 is any wide area network (for example, the internet) capable of communicating computer data over non-local distances by any technology for communicating computer data, now known or to be developed in the future. In some embodiments, the WAN 1202 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1203 is any computer system that is used and controlled by an end user (for example, a customer of an enterprise that operates computer 1201) and may take any of the forms discussed above in connection with computer 1201. EUD 1203, which may include the components of a host 102 (FIG. 1) or a controller 116 (FIG. 1 or controller 216 (FIG. 2), typically sends and receives helpful and useful data which would typically be communicated through network module 1215 of computer 1201 through WAN 1202 to EUD 1203. In this way, EUD 1203 can display, or otherwise present, useful data to be stored or read. In some embodiments, EUD 1203 may be a client device, such as thin client, heavy client, mainframe computer, desktop computer and so on.

REMOTE SERVER 1204 is any computer system that serves at least some data and/or functionality to computer 1201. Remote server 1204 may be controlled and used by the same entity that operates computer 1201. Remote server 1204 may provide for the execution of at least some of the computer code involved in performing the inventive methods, including write data management in accordance with the present description.

PUBLIC CLOUD 1205 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 1205 is performed by the computer hardware and/or software of cloud orchestration module 1241. The computing resources provided by public cloud 1205 are typically implemented by virtual computing environments that run on various computers making up the computers of host physical machine set 1242, which is the universe of physical computers in and/or available to public cloud 1205. The virtual computing environments (VCEs) typically take the form of virtual machines from virtual machine set 1243 and/or containers from container set 1244. It is understood that these VCEs may be stored as images and may be transferred among and between the various physical machine hosts, either as images or after instantiation of the VCE. Cloud orchestration module 1241 manages the transfer and storage of images, deploys new instantiations of VCEs and manages active instantiations of VCE deployments. Gateway 1240 is the collection of computer software, hardware, and firmware that allows public cloud 1205 to communicate through WAN 1202.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1206 is similar to public cloud 1205, except that the computing resources are only available for use by a single enterprise. While private cloud 1206 is depicted as being in communication with WAN 1202, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1205 and private cloud 1206 are both part of a larger hybrid cloud.

The controller 128 and the computer 140 of FIG. 1 are described as performing various logic functions. In one embodiment, the controller 128 and the computer 140 includes processors which cause operations which perform the various logic functions. Alternatively, one or more of these logic functions may be performed by one or more of programmed centralized processors such as central processing units (CPUs) and programmed distributed processors such as integrated circuit logic devices such as Application Specific Integrated Circuit (ASIC) devices, for example. Programming of such hardware may be provided by one or more of software and firmware alone or in combination and stored in a memory of the controller 128. In other embodiments, some or all of the logic functions of the controller 128 and computer 140 may be performed by dedicated or hard-wired logic circuitry.

One or more of the controllers 128 and computer 140 may be implemented as program modes which may comprise routines, programs, objects, components, logic, data structures, and so on that perform particular tasks or implement particular abstract data types. The program components and hardware devices of the tape drive 100 of FIG. 1 may be implemented in one or more computer systems, where if they are implemented in multiple computer systems, then the computer systems may communicate over a network.

The present invention may be a system, device, a method, and/or a computer program product. The computer program product may include a computer readable storage medium (or media) having computer readable program instructions thereon for causing a processor to carry out aspects of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing g. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The letter designators, such as i, is used to designate a number of instances of an element may indicate a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for managing write data for a tape media, wherein the computer program product comprises a computer readable storage medium having program instructions embodied therewith, the program instructions executable by a processor to cause operations, the operations comprising:

receiving a first list identifying portions of write data code words to be written on the tape media, wherein each code word includes at least one data portion and at least one parity portion related to the at least one data portion of a particular code word;

generating a second list of the portions of write data code words of the first list, including reordering the portions of write data code words of the first list to provide a configurable minimum spatial separation between the at least one data portion and the related at least one parity portion of each code word when written on the tape media; and writing on the tape media by a tape drive, the portions of write data code words reordered as a function of the second list to provide an actual physical spatial separation along the tape media between the at least one data portion and the related at least one parity portion of each code word of the second list as a function of the minimum spatial separation.

2. The computer program product of claim 1 wherein the first list of portions of write data code words is received by the tape drive from a host, and the second list of the portions of write data code words of the first list is generated by the tape drive, and wherein the operations further comprise transmitting the generated second list to the host and receiving by the tape drive from the host, the portions of write data code words reordered as a function of the second list for writing on the tape media.

3. The computer program product of claim 1 wherein writing portions of write data code words on the tape media includes writing received write data on the tape media sequentially in wraps and wherein reordering the portions of write data code words of the first list in generating the second list of the portions of write data code words further includes determining whether the at least one data portion and the related at least one parity portion of the same code word to be written to the tape media is to be written in the same wrap.

4. The computer program product of claim 3 wherein reordering the portions of write data code words of the first list in generating the second list of the portions of write data code words includes ordering portions of write data code words of the first list in a first write order pattern for a first code word determined to have a data portion and a parity portion to be written in the same wrap, so that the minimum spatial separation between a data portion and a parity portion of the first code word is maintained.

5. The computer program product of claim 4 wherein the first write order pattern interleaves a data portion and a parity portion of one code word with at least one of a data portion and a parity portion of at least one other code word so that the minimum spatial separation between the at least one data portion and the related at least one parity portion of each code word when written on the tape media is maintained.

6. The computer program product of claim 1 wherein writing portions of write data code words on the tape media includes writing received write data on the tape media sequentially in wraps and wherein reordering the portions of write data code words of the first list in generating the second list of the portions of write data code words further includes determining whether a data portion and a parity portion of the same code word to be written to the tape media is to be written in different wraps.

7. The computer program product of claim 6 wherein reordering the portions of write data code words of the first list in generating the second list of the portions of write data code words further includes ordering portions of write data code words of the first list in a second write order pattern for a second code word determined to have a data portion and a parity portion to be written in different wraps, so that the minimum spatial separation between the at least one data portion and the related at least one parity portion of each code word when written on the tape media is maintained.

8. The computer program product of claim 7 wherein the second write order pattern interleaves between a data portion and a parity portion of the second code word with a plurality of at least one of a data portion and a parity portion of a plurality of other code words so that the minimum spatial separation between a data portion and a parity portion of the second code word is maintained.

9. The computer program product of claim 2 wherein the operations further comprise the tape drive receiving from the host in association with receiving the first list of portions of write data code words, write parameters defining at least one of a data portion size, a parity portion size of a code word of write data, and a specified minimum spatial separation between a data portion and a parity portion of the same code word to be written to the tape media.

10. The computer program product of claim 1 wherein reordering the portions of write data code words of the first list in generating the second list of the portions of write data code words is a function of additional write parameters including at least one of a tape cartridge type, a medium recording format, a recording density, and a write append point.

11. The computer program product of claim 1 wherein reordering the portions of write data code words of the first list in generating the second list of the portions of write data code words is a function of at least one write parameter defining at least one of the data portion size, the parity portion size, the minimal spatial separation, a tape cartridge type, a medium recording format, a recording density, and a write append point.

12. A computer-implemented method, comprising:
receiving a first list identifying portions of write data code words to be written on a tape media, wherein each code word includes at least one data portion and at least one parity portion related to the at least one data portion of a particular code word;
generating a second list of the portions of write data code words of the first list, including reordering the portions of write data code words of the first list to provide a configurable minimum spatial separation between the at least one data portion and the related at least one parity portion of each code word when written on the tape media; and
writing on the tape media by a tape drive, the portions of write data code words reordered as a function of the second list to provide an actual physical spatial separation along the tape media between the at least one data portion and the related at least one parity portion of each code word of the second list as a function of the minimum spatial separation.

13. The method of claim 12 wherein the first list of portions of write data code words is received by the tape drive from a host, and the second list of the portions of write data code words of the first list is generated by the tape drive, and wherein the method further comprises transmitting the generated second list to the host and receiving by the tape drive from the host, the portions of write data code words reordered as a function of the second list for writing on the tape media.

14. The method of claim 12 wherein writing portions of write data code words on the tape media includes writing received write data on the tape media sequentially in wraps and wherein reordering the portions of write data code words of the first list in generating the second list of the portions of write data code words further includes determining whether the at least one data portion and the related at least one parity portion of the same code word to be written to the tape media is to be written in the same wrap, and ordering portions of write data code words of the first list in a first write order pattern for a first code word determined to have a data portion and a parity portion to be written in the same wrap, so that the minimum spatial separation between a data portion and a parity portion of the first code word is maintained.

15. The method of claim 14 wherein the first write order pattern interleaves a data portion and a parity portion of one code word with at least one of a data portion and a parity portion of at least one other code word so that the minimum spatial separation between the at least one data portion and the related at least one parity portion of each code word when written on the tape media is maintained.

16. The method of claim 12 wherein writing portions of write data code words on the tape media includes writing received write data on the tape media sequentially in wraps and wherein reordering the portions of write data code words of the first list in generating the second list of the portions of write data code words further includes determining whether a data portion and a parity portion of the same code word to be written to the tape media is to be written in different wraps, and ordering portions of write data code words of the first list in a second write order pattern for a second code word determined to have a data portion and a parity portion to be written in different wraps, and wherein the second write order pattern interleaves between a data portion and a parity portion of the second code word with a plurality of at least one of a data portion and a parity portion of a plurality of other code words so that the minimum spatial separation between a data portion and a parity portion of the second code word is maintained.

17. The method of claim 13 wherein the operations further comprise the tape drive receiving from the host in association with receiving the first list of portions of write data code words, write parameters defining at least one of a data portion size, a parity portion size of a code word of write data, and a specified minimum spatial separation between a data portion and a parity portion of the same code word to be written to the tape media.

18. The method of claim 12 wherein reordering the portions of write data code words of the first list in generating the second list of the portions of write data code words is a function of at least one write parameter defining at least one of the data portion size, the parity portion size, the minimal spatial separation, a tape cartridge type, a medium recording format, a recording density, and a write append point.

19. A device for managing write data for a tape media, comprising:
at least one processor; and
a computer program product comprising a computer readable storage medium having program instructions embodied therewith, the program instructions executable by a processor to cause operations, the operations comprising:
receiving a first list identifying portions of write data code words to be written on the tape media, wherein each code word includes at least one data portion and at least one parity portion related to the at least one data portion of a particular code word;
generating a second list of the portions of write data code words of the first list, including reordering the portions of write data code words of the first list to provide a configurable minimum spatial separation between the at least one data portion and the related at least one parity portion of each code word when written on the tape media; and
writing on the tape media by a tape drive, the portions of write data code words reordered as a function of the second list to provide an actual physical spatial separation along the tape media between the at least one data portion and the related at least one parity portion of each code word of the second list as a function of the minimum spatial separation.

20. The device of claim 19 for use with a host and further comprising a tape drive having a processor of the at least one processor, wherein the operations are performed by the tape drive and further comprise transmitting the generated second list to the host and receiving by the tape drive from the host, the portions of write data code words reordered as a function of the second list for writing on the tape media.

21. The device of claim 19 wherein the operations further comprise writing received write data on the tape media sequentially in wraps and wherein reordering the portions of write data code words of the first list in generating the second list of the portions of write data code words further includes determining whether the at least one data portion and the related at least one parity portion of the same code word to be written to the tape media is to be written in the same wrap, and ordering portions of write data code words of the first list in a first write order pattern for a first code word determined to have a data portion and a parity portion to be written in the same wrap, so that the minimum spatial separation between a data portion and a parity portion of the first code word is maintained.

22. The device of claim 21 wherein the first write order pattern interleaves a data portion and a parity portion of one code word with at least one of a data portion and a parity portion of at least one other code word so that the minimum spatial separation between the at least one data portion and the related at least one parity portion of each code word when written on the tape media is maintained.

23. The device claim 19 wherein writing portions of write data code words on the tape media includes writing received write data on the tape media sequentially in wraps and wherein reordering the portions of write data code words of the first list in generating the second list of the portions of write data code words further includes determining whether a data portion and a parity portion of the same code word to be written to the tape media is to be written in different wraps, and ordering portions of write data code words of the first list in a second write order pattern for a second code word determined to have a data portion and a parity portion to be written in different wraps, and wherein the second write order pattern interleaves between a data portion and a parity portion of the second code word with a plurality of at least one of a data portion and a parity portion of a plurality of other code words so that the minimum spatial separation between a data portion and a parity portion of the second code word is maintained.

24. The device of claim 20 wherein the operations further comprise the tape drive receiving from the host in association with receiving the first list of portions of write data code words, write parameters defining at least one of a data portion size, a parity portion size of a code word of write data, and a specified minimum spatial separation between a data portion and a parity portion of the same code word to be written to the tape media.

25. The device of claim 19 wherein reordering the portions of write data code words of the first list in generating the second list of the portions of write data code words is a function of at least one write parameter defining at least one of the data portion size, the parity portion size, the minimal spatial separation, a tape cartridge type, a medium recording format, a recording density, and a write append point.

* * * * *